United States Patent [19]

Sachs et al.

[11] Patent Number: 5,956,034
[45] Date of Patent: Sep. 21, 1999

[54] METHOD AND APPARATUS FOR VIEWING ELECTRONIC READING MATERIALS

[75] Inventors: James Sachs, Menlo Park; Thomas W. Pomeroy, Atherton, both of Calif.

[73] Assignee: SoftBook Press, Inc., Menlo Park, Calif.

[21] Appl. No.: 08/693,678

[22] Filed: Aug. 13, 1996

[51] Int. Cl.[6] .................................................. G06F 3/00
[52] U.S. Cl. .......................................................... 345/350
[58] Field of Search .................................... 345/339, 348, 345/349, 350, 901; 380/4, 49

[56] References Cited

U.S. PATENT DOCUMENTS

| D. 276,626 | 12/1984 | Lockwood | D20/2 |
| D. 289,777 | 5/1987 | Thomas | D20/1 |
| D. 330,544 | 10/1992 | Kane | D14/103 |
| D. 339,329 | 9/1993 | Lacko | D14/103 |
| D. 346,620 | 5/1994 | McSorley | D19/59 |
| D. 359,306 | 6/1995 | Lande et al. | D19/26 |
| D. 362,271 | 9/1995 | Luong | D14/106 |
| D. 362,272 | 9/1995 | Luong | D19/60 |
| D. 362,461 | 9/1995 | Luong | D19/60 |
| 3,718,906 | 2/1973 | Lightner | 379/201 |
| 4,159,417 | 6/1979 | Rubincam | 235/375 |
| 4,490,810 | 12/1984 | Hon | 463/43 |
| 4,545,023 | 10/1985 | Mizzi | 364/709.13 |
| 4,575,621 | 3/1986 | Dreifus | 235/380 |
| 4,591,974 | 5/1986 | Dornbush et al. | 707/509 |
| 4,597,058 | 6/1986 | Izumi et al. | 711/115 |

(List continued on next page.)

FOREIGN PATENT DOCUMENTS

| 0 390 611 | 10/1990 | European Pat. Off. . |
| 2657187 | 7/1991 | France . |
| 2657451 | 7/1991 | France . |
| 2 149 544 | 6/1985 | United Kingdom . |
| WO 87/01481 | 3/1987 | WIPO . |
| WO 89/05023 | 6/1989 | WIPO . |
| WO 97/20274 | 6/1997 | WIPO . |

OTHER PUBLICATIONS

Dvorak, et al.; "A Methodology for User Centred Link Structure for Textbook to Hypertext Conversion" IEEE Jan. 1992, pp. 619–628.
Pobiak "Adjustable Access Electronic Books", IEEE, Jan. 1992 pp. 90–94.
Tony Ramos, "Making Book on Electronic Books" College Store Journal—Sep./Oct. 1992.
Electronic Campus, The Wall Street Journal—Jun. 1, 1993.
Watanabe, et al., "Visual Interface for Retrieval of Electronic–formed Books" IEEE Jul. 1993, pp. 692–695.
The Heller Report—Oct. 1993.
IBM To Unveil Plan To Skip Disks, Send Software By Satellite, The Wall Street Journal—Nov. 1, 1994.
This Little Computer Tries To Be A Book, St. Louis Post –Dispatch, Jan. 4, 1995.
Now, Data By Satellite (no date).

*Primary Examiner*—A. Katbab
*Attorney, Agent, or Firm*—Blakely, Sokoloff, Taylor & Zafman LLP

[57] ABSTRACT

An electronic publication publishing and distribution system is provided for dissemination of written materials that can be read on a portable electronic book. A host computer contains an inventory of written materials in electronic form, that can be selected and then downloaded into the portable electronic book's memory. The host computer keeps track of the transactions, and encodes the data prior to downloading, using an encryption system involving a security number that is unique to the portable electronic book. The encrypted data cannot be decrypted until it is resident in the memory of the portable electronic book. Upon receipt of the encrypted data, the portable electronic book decrypts the data, and can display the text of the original material on its display screen. The portable electronic book has a central processing unit with an operating system for controlling the functions of the portable electronic book. There is non-volatile electronic memory storage for retaining publications in the portable electronic book. A plurality of electronic keys is provided in the portable electronic book that corresponds to graphical representations such as icons on the portable electronic book display adjacent to each key. These keys are integral to the user interface for controlling the devices.

43 Claims, 22 Drawing Sheets

U.S. PATENT DOCUMENTS

| | | | |
|---|---|---|---|
| 4,601,011 | 7/1986 | Grynberg | 37/338 |
| 4,649,499 | 3/1987 | Sutton et al. | 345/419 |
| 4,682,161 | 7/1987 | Bugg | 345/130 |
| 4,725,977 | 2/1988 | Izumi et al. | 364/479.04 |
| 4,779,080 | 10/1988 | Coughlin et al. | 345/157 |
| 4,820,167 | 4/1989 | Nobles et al. | 434/336 |
| 4,855,725 | 8/1989 | Fernandez | 345/173 |
| 4,899,292 | 2/1990 | Montagna et al. | 707/501 |
| 4,916,441 | 4/1990 | Gombrich | 345/169 |
| 4,918,632 | 4/1990 | York | 361/680 |
| 4,972,496 | 11/1990 | Sklarew | 382/187 |
| 4,985,697 | 1/1991 | Boulton | 345/192 |
| 5,021,789 | 6/1991 | Fujisawa et al. | 345/350 |
| 5,025,373 | 6/1991 | Keyser, Jr. et al. | 380/24 |
| 5,031,119 | 7/1991 | Dulaney et al. | 345/349 |
| 5,065,345 | 11/1991 | Knowles et al. | 345/302 |
| 5,091,939 | 2/1992 | Cole et al. | 380/25 |
| 5,109,354 | 4/1992 | Yamashita et al. | 364/708.1 |
| 5,115,508 | 5/1992 | Hatta | 340/825.34 |
| 5,121,492 | 6/1992 | Saville, III et al. | 395/500 |
| 5,133,076 | 7/1992 | Hawkins et al. | 364/709.11 |
| 5,146,552 | 9/1992 | Cassorla et al. | 707/512 |
| 5,157,491 | 10/1992 | Kassatly | 348/15 |
| 5,157,737 | 10/1992 | Sklarew | 382/315 |
| 5,157,783 | 10/1992 | Anderson et al. | 707/4 |
| 5,199,104 | 3/1993 | Hirayama | 345/350 |
| 5,203,001 | 4/1993 | Yanagiuchi et al. | 711/100 |
| 5,214,696 | 5/1993 | Keiser, II et al. | 380/4 |
| 5,221,838 | 6/1993 | Gutman et al. | 235/379 |
| 5,222,136 | 6/1993 | Rasmussen et al. | 380/9 |
| 5,226,080 | 7/1993 | Cole et al. | 380/25 |
| 5,231,662 | 7/1993 | Van Rumpt et al. | |
| 5,233,333 | 8/1993 | Borsuk | 345/127 |
| 5,239,665 | 8/1993 | Tsuchiya | 345/326 |
| 5,245,656 | 9/1993 | Loeb et al. | 380/23 |
| 5,247,661 | 9/1993 | Hager et al. | 707/104 |
| 5,253,294 | 10/1993 | Maurer | 380/21 |
| 5,319,582 | 6/1994 | Ma | 364/708.1 |
| 5,333,116 | 7/1994 | Hawkins et al. | 364/708.1 |
| 5,339,091 | 8/1994 | Yamazaki et al. | 345/104 |
| 5,359,707 | 10/1994 | Sato | 707/532 |
| 5,365,598 | 11/1994 | Sklarew | 382/189 |
| 5,367,621 | 11/1994 | Cohen et al. | 707/501 |
| 5,379,057 | 1/1995 | Clough et al. | 345/173 |
| 5,388,196 | 2/1995 | Pajak et al. | 345/329 |
| 5,392,387 | 2/1995 | Fitzpatrick et al. | 345/350 |
| 5,398,310 | 3/1995 | Tchao et al. | 707/541 |
| 5,404,505 | 4/1995 | Levinson | 707/10 |
| 5,428,606 | 6/1995 | Moskowitz | 370/400 |
| 5,438,344 | 8/1995 | Oliva | 345/507 |
| 5,457,746 | 10/1995 | Dolphin | 380/4 |
| 5,463,725 | 10/1995 | Henckel et al. | 345/350 |
| 5,465,213 | 11/1995 | Ross | 364/468.24 |
| 5,467,102 | 11/1995 | Kuno et al. | 345/1 |
| 5,475,399 | 12/1995 | Borsuk | 345/130 |
| 5,477,510 | 12/1995 | Ukita | 349/18 |
| 5,483,586 | 1/1996 | Sussman | 379/201 |
| 5,598,470 | 1/1997 | Cooper et al. | 380/4 |
| 5,615,264 | 3/1997 | Kazmierczak et al. | 380/4 |
| 5,629,980 | 5/1997 | Stefik et al. | 380/4 |
| 5,638,443 | 6/1997 | Stefik et al. | 380/4 |
| 5,697,793 | 12/1997 | Huffman et al. | 434/317 |
| 5,719,943 | 2/1998 | Amada et al. | 380/49 |
| 5,734,823 | 3/1998 | Saigh | 395/200.59 |
| 5,734,891 | 3/1998 | Saigh | 707/10 |

METHOD AND APPARATUS FOR VIEWING ELECTRONIC READING MATERIALS

BACKGROUND OF THE INVENTION

1. Field of the Invention

The present invention relates generally to the publication and distribution of electronic reading materials, and to a method and apparatus for viewing electronic reading materials.

2. Description of the Related Art

Electronic reading materials are commonly available on various on-line computer services, such as America On Line, Compuserve, the Internet and the World Wide Web. These materials are typically in the public domain, as there is no accepted method for distribution that maintains the integrity of copyrighted materials. This is due in part to the ease with which the recipient of the documents can redistribute them at no cost to potentially thousands of other subscribers, with no accounting for the royalties that are due to the copyright holder.

Although it is a simple process for on-line subscribers to download these materials to their computer using a telephone line modem or other communication system, it is not practical for multiple-page documents to be read while sitting at a computer terminal.

Accordingly, there is a need in the technology for a system for retaining a library of publications and for selectively loading these publications into a portable viewer with non-volatile memory storage. There is also a need in the technology for providing a secure communications system that permits downloading of copyrighted materials without concern for their proliferation through present on-line services.

SUMMARY OF THE INVENTION

The present invention is directed to a system for retaining a library of publications and for selectively loading these publications into a remote portable electronic viewing unit with non-volatile memory storage. The present invention also provides for a secure communications system that permits downloading of copyrighted materials without concern for their proliferation through present on-line services.

One embodiment of the present invention includes an electronic publication and distribution system having a host computer which communicates with a plurality of remote, portable electronic viewing units, such as portable electronic books. The portable electronic books are designed to be able to load publications, selected from a bookstore or other on-line source via the host computer, into the remote computer memory. Each portable electronic book has a modem or other communications part for receiving and transferring data between the host and the portable electronic book. The portable electronic book has a central processing unit with an operating system for controlling the functions of the portable electronic book. There is non-volatile electronic memory storage for retaining publications in the portable electronic book. A plurality of electronic switches are provided in the portable electronic book that correspond to graphical representations such as icons on the portable electronic book display adjacent to each switch. These switches are integral to the user interface for controlling the devices. A digitized pen input system can also be provided for the user interface.

Accordingly, an object of the invention is to provide an improved publication distribution system and a method of storing publications and for loading a selected program or set of publications into an electronic display device.

Another object of the invention is to provide a method of maintaining a publication "virtual bookstore" that allows for an effective manner of examining the contents according to individual interests, and selecting the material to download.

A further object of the invention is to provide a portable electronic viewing unit that is compatible with the virtual bookstore, and the corresponding security and communication features.

A further object of the invention is to provide a user interface in the portable viewer that facilitates the selection, navigation and manipulation of the published works as they are read.

DETAILED DESCRIPTION OF THE PREFERRED EMBODIMENT

In the following description, the terms electronic publications, reading materials, text and documents are used interchangeably and generally refer to reading materials, pictures and graphics that can be read by literate individuals. The features: remote viewing system, portable viewer, electronic book and display device, refer to a system for viewing reading materials. The terms: user interface, navigation, control and manipulation, refer to methods for controlling the environment of the reading materials. Typical applications are reading materials that are of such a time-sensitive nature that publication and distribution via conventional means is not practical. Other applications include materials that consist of a collection of texts from a plurality of sources which are compiled in such a way as to provide value to the reader, materials currently out of print, and materials of highly specialized interest, limited interest or of unknown interest so as to not justify publication in printed form.

Figure 1:
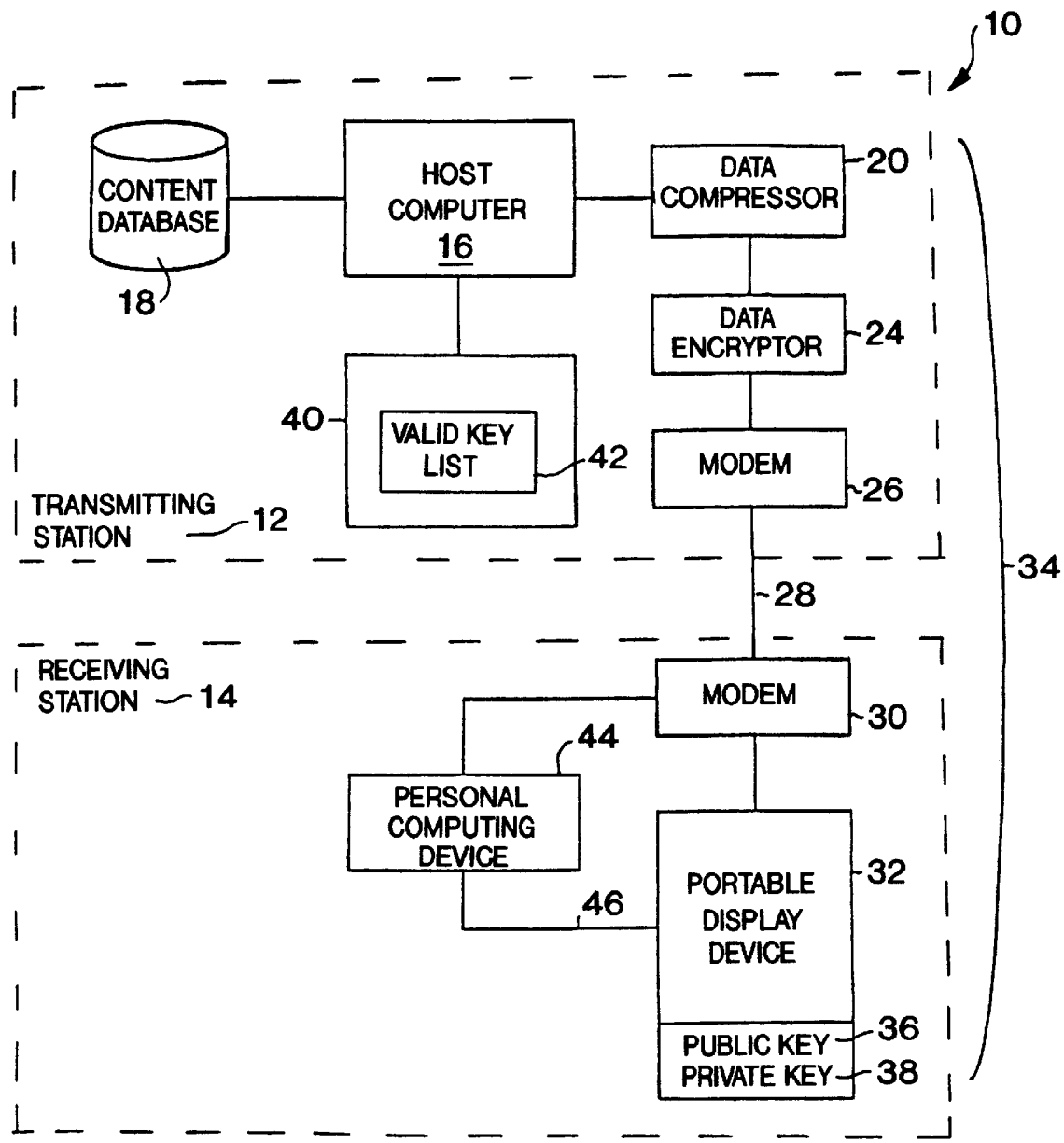
FIG. 1 is an overall block diagram of the publication and distribution system 10 of the present invention.

Referring now to FIG. 1, the publication and distribution system 10 of the present invention includes transmitting station 12 and receiving station 14. The transmitting station 12 includes host computer 16, content database 18, data compressor 20, data encryptor 24, modem 26 and memory 40. The receiving station 14 includes modem 30, which is connected to a portable display unit 32 and optionally, a personal computing device 44. It should be understood that, although the data communication between the computer 16 and the computer 44 or device 32 is described as unidirectional (from the computer 16 to the computer 44 or device 32), the system 10 allows for bi-directional communication. In addition, one of ordinary skill in the art will recognize that either one side or both sides of the system 10 can be embodied as a transmitter/receiver. The publication and distribution system 10 is controlled by a host computer 16 located within the transmitting station 12. The host computer 16 can be any computer, data processing system, or World Wide Website capable of handling the peripheral devices described below.

The host computer 16 manages a content database 18 which contains primarily copyrighted publications or works. In the process of distributing these works, the host computer 16 communicates with a portable display unit 32 located within the receiving station 14. The receiving station 14 includes modem 30, which is connected to a portable display unit 32 through a communications channel 34, which may be a digital data stream on a telephone line, an Integrated Services Digital Network (ISDN) line, a coaxial cable, a fiber optic cable or any other serial streaming medium.

As shown in FIG. 1, the communications channel 34 includes data compressor 20, data encryptor 24 and modem 26 which are located at the transmitting station 12, and modem 30, and optionally, a personal computing device 44 and portable display units which are located in the receiving station 14. The host computer 16 first interrogates the portable display unit 32 through the data channel 34 for its unique serial number, which consists of a number that serves as a "public key" 36 in the data encryption system. The host computer 16 compares the public key 36 against a valid key list 42 located in memory 40 to determine whether it is a valid key. If it is, the host computer 16 passes the data through the data compressor 20, which may be a software algorithm, hardware device, or combination of the two. The host computer 16 then uses this key 36 to encrypt the selected published works from the content database 18 using a corresponding private key from the key list 42, and a data encryptor 24, which may be a software algorithm, hardware device, or combination of the two, as is known in the technology.

The encrypted, compressed data is then sent to the display device 32 through a modem 26 located at the transmitting end of the system 12. The modem 26 modulates the data according to the requirements of a transmission medium 28, which may be a landline, a satellite, a cable, a fiber or other telecommunications medium. At the receiving end, a modem 30 demodulates the data provided in a transmission medium 28. The modem 28 can then provide this data to the portable display unit 32, or alternatively, to a personal computing device 44, which then provides the data to the display device 32 through an electronic connection 46.

Once the data is in the portable display unit 32, the data is decrypted using the private key 38 of the device 32. This is accomplished either through a software algorithm, a hardware device, or combination of the two, as is known in the technology. The resulting compressed data is then stored in non-volatile memory in the portable display unit 32.

Figure 2A:
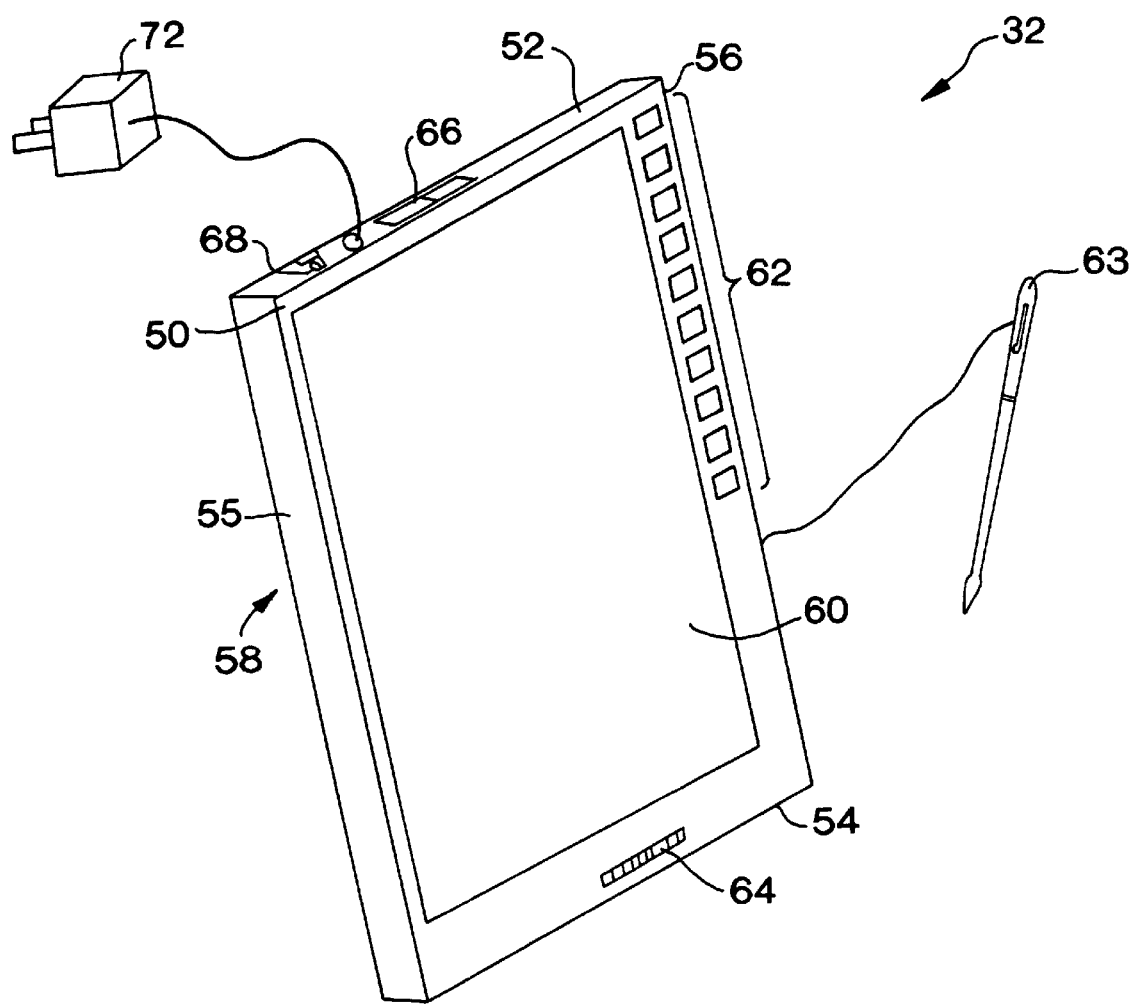
FIG. 2A is one embodiment of the portable display unit 32 of the present invention, as utilized in the publication and distribution system 10 of FIG. 1.

FIG. 2A is one embodiment of the portable display unit 32 of the present invention, as utilized in the publication and distribution system 10 of FIG. 1. The portable display unit 32 a slim rectangular unit of six inches in width, seven inches in height and one inch thick. The portable display unit has a front face 50, a top 52, a base 54, a first side 55, a second side 56 and a back 58. The front face 50 includes a display screen 60, which may be a liquid crystal display (LCD), cathode ray tube (CRT), electro-luminescent display (EL) or other display device as is known in the technology. In a preferred embodiment, the display screen 60 is an LCD. Located next to the display screen 60, along the second side 56, are a plurality of keys or function switches 62, which are used to select icons displayed on the display screen 60. These icons represent a variety of functions that are provided by the portable display unit 32, as will be discussed in detail in the following sections. The brightness of the display screen 60 is controlled by an LCD adjust switch 64 located below the display screen 60, at the bottom of the front face 50.

Located on the top 52 of the portable display unit 32 is a switch 66 for powering the portable display unit 32 on or off. In addition, an RJ-11 phone jack 68 is located on the top 52, as is a connector 70 for connection to an AC adapter 72. The phone jack 68 and connector 70 may alternatively be located on the back 58 of the portable display unit 32. In addition, the portable display unit 32 may be powered by batteries such as NiMh batteries. The portable display unit 32 also includes an electronics module (not shown), which includes a central processing unit (CPU), memory units such as Read-Only Memory (ROM), Random Access Memory (RAM) and non-volatile Random Access Memory (NVRAM), an internal modem, the LCD driver, a charge circuit and a clock, and optionally, a pen and digitizer screen overlaid on the display screen 60.

Figure 2B:
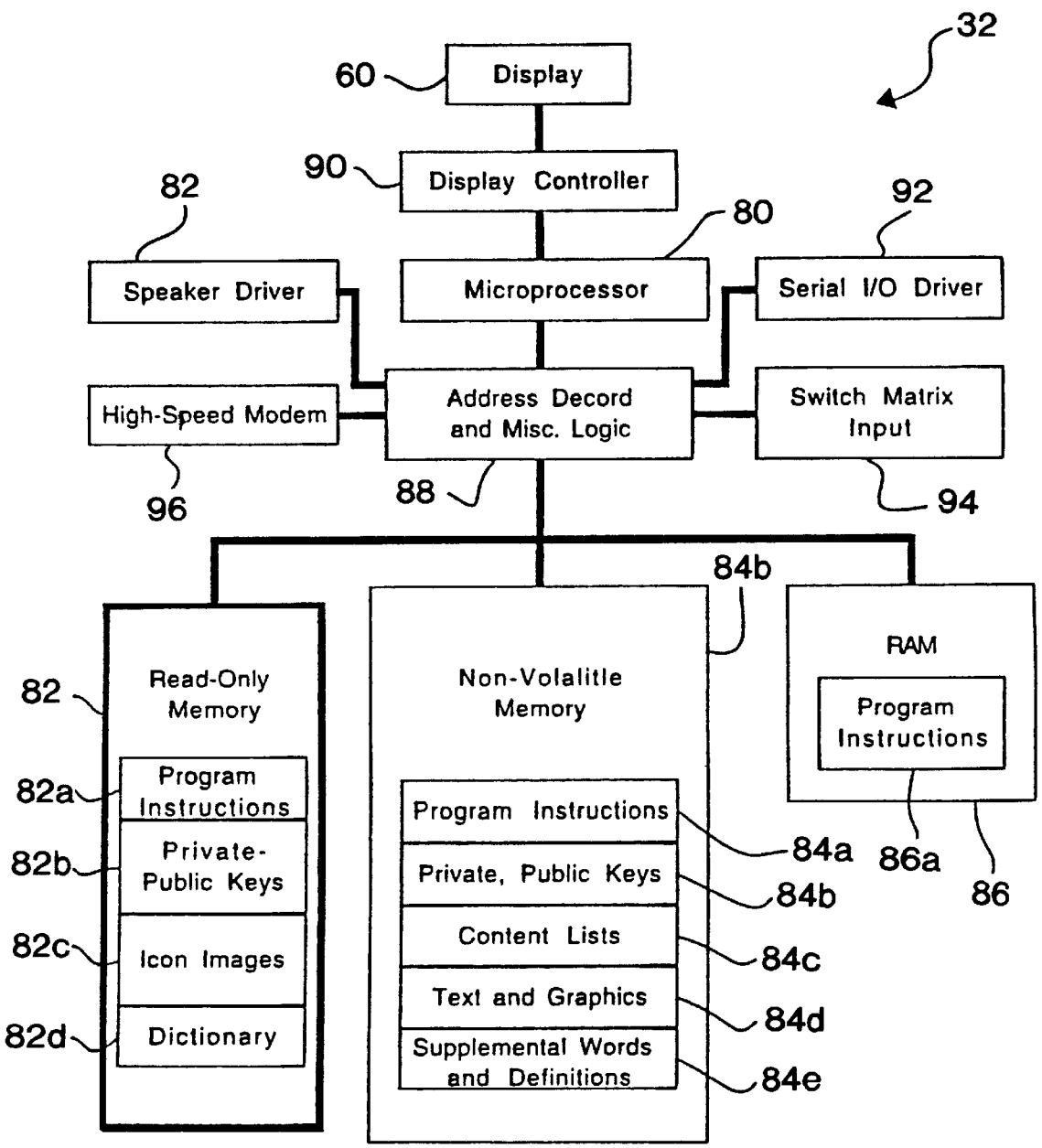
FIG. 2B is a detailed block diagram of the portable display unit 32 of FIG. 2A.

FIG. 2B is a detailed block diagram of the portable display unit 32 of FIG. 2B. The portable display unit 32 is controlled by a central processing unit (CPU) 80, which can execute program instructions from Read Only Memory ROM (ROM) 82, non-volatile Random Access Memory (NVRAM) 84, or Random Access Memory (RAM) 86. These instructions 82a, 84a and 86a located in ROM 82, NVRAM 84 and RAM 86 respectively, provide the control for all the device operations of the portable display unit 32. The CPU 80 is coupled to address decode circuit 88, which also comprises miscellaneous logic circuitry. The address decode circuit 88, which performs address decoding, is coupled to a speaker driver 90, a serial I/O driver 92, function switches 62, a pen digitizer 63 and a high speed modem 96. The speaker driver 90 drives speakers (not shown) connected to the portable display unit 32, while the serial I/O driver 92 drives the I/O devices such as a printer, or a connection to a standard personal computer.

The printer connected via the serial I/O driver 92 enables the portable display unit 32 to produce a hard copy of the published materials stored in the memory of the portable display unit 32. In the preferred embodiment, the portable display unit 32 will not permit the printing of copyrighted works that have been purchased through the host computer 16. As described earlier, the switches 62 are used for selecting icons displayed on the display screen. Alternatively, the switches 62 may exist as a touch-sensitive overlay on the top 52 of display screen 60 of the display unit 32. In the latter case, the user simply touches the surface of the display screen 60 directly above the icon of the function desired.

The modem 96 may be internal or external to the display device 32, and is used to communicate with the host computer 16 of FIG. 1. If an external modem is used, it may be represented by modem 30 in FIG. 1. In this case, modem 96 in FIG. 2 will not be used. If an internal modem such as modem 96 is used, then modem 30 of FIG. 1 will not be utilized. For secure data transactions, serialized public and private keys 82b or 84b are used. The public and private keys 82b or 84b are stored either in ROM 82 or NVRAM 84, or any other semiconductor device as is known in the technology. As discussed earlier, the display device 32 displays its information on a display screen 60, which is controlled by a display controller 98 that is compatible with the display 60.

Operation of the portable display unit 32 is accomplished through a plurality of function switches 62 located on the face 50 of the portable display unit 32, along the second side 56, each of which corresponds to functions the user wishes to activate. The function of the switches 62 can be changed under software control. Alternatively, operation of the portable display unit 32 may be controlled through input via pen 63. The pen 63 may be a stylus pen, as is known in the art. Such stylus pens are available in various technologies, including but not limited to touch sensitive, resistive stylus pens. In the present preferred embodiment, the controlling program identifies to the user, the function of the switches 62 by displaying a representation of the functions of the switches 62 on a display page 60a (see FIG. 3A) on display screen 60. The representations are located adjacent to the switches 62 and may be in the form of an icon, text, or combination of the two. In a preferred embodiment, the representation is an icon. The icon images 82c are stored in ROM 82 or in NVRAM 84.

Figure 3A:
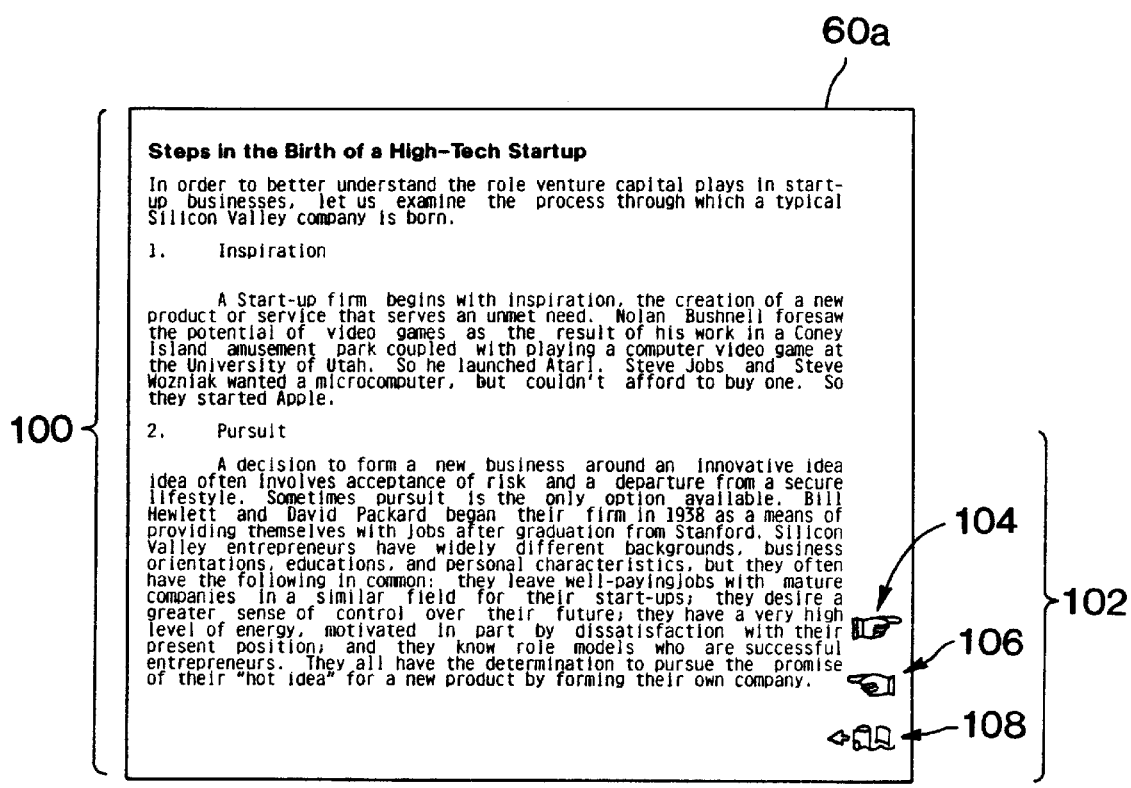
FIG. 3A is an exemplary main screen display page 60a provided on screen 60 of FIGS. 2A and 2B, illustrating the features of one embodiment of the present invention.
Figure 3B:
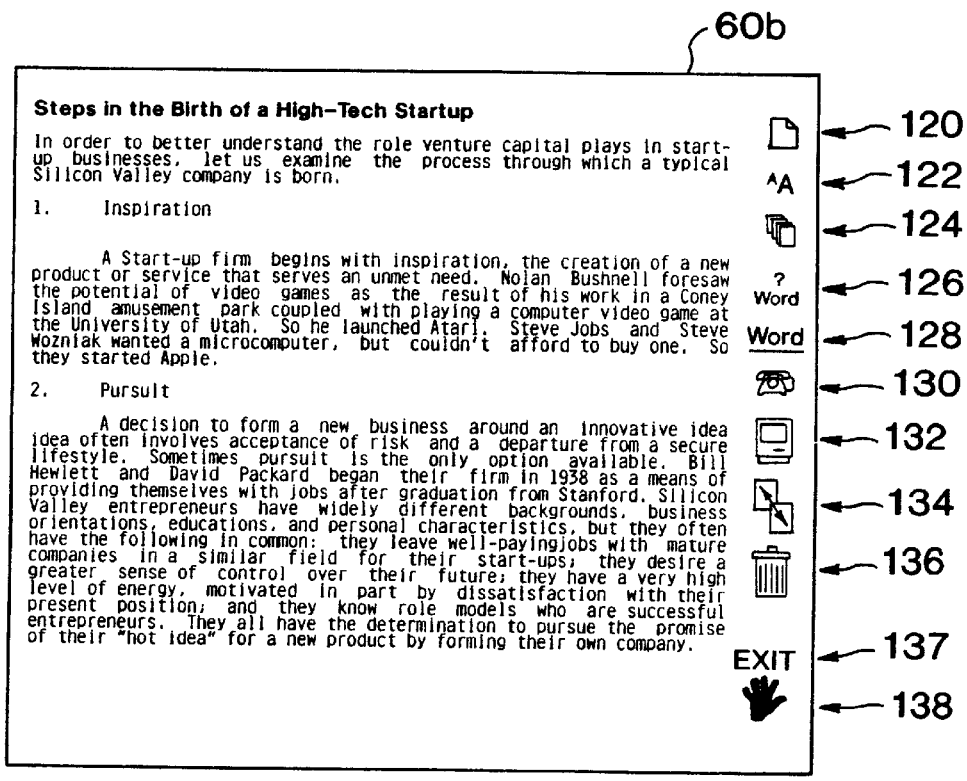
FIG. 3B is an exemplary function icons screen display page 60b provided on display screen 60 of FIGS. 2A and 2B, illustrating the features of another embodiment of the present invention.

Referring now to FIGS. 3A and 3B, the operation of the device 32 is made by first selecting one of a plurality of functions represented by icons 62, text, or both on a display page 64a of the display screen 60 by pressing on a switch 62 that corresponds to the function desired. These physical switches may be adjacent to the display screen 60, or may exist as a touch-sensitive overlay on top of display screen 60 of the portable display unit 32. In the latter, the user simply touches the surface of the display screen 60 directly above the icon of the function desired.

FIG. 3A is an exemplary main display page 60a provided on display screen 60 of FIGS. 2A and 2B, illustrating the features of one embodiment of the present invention. When the portable display unit 32 is powered on, the display screen 60 first displays the main display page 60a, as shown in FIG. 3A. On the main display page 60a, display text 100, graphics (not shown) and/or photographs (not shown) that constitute electronic reading materials are displayed. The display text 100, graphics or photographs may be displayed alone or in combination. Navigation of the reading materials is effected by different functions as represented by a plurality of function displays, such as icons 102. One such function corresponds to the effect of "turning the page" and an icon 104 representing turning to the next page is provided for the selection of this function. When thus selected, the display screen 60 will display the text and graphics from the next page. Similarly, an icon 106 representing the function of turning to the previous page enables the user to go back through the text 100 when the icon 106 is selected. A third icon 108 enables the user to view other display functions when selected. These additional display functions are illustrated in FIG. 3B.

When the display function icon 108 is selected, the display screen 60 displays the display page 60b as shown in FIG. 3B. The display page 60b illustrates text 100 along with a plurality of function icons such as the "mark page" icon 120, the "change font" icon 122, the "flip through pages" icon 124, the "dictionary" icon 126, the "underline" icon 128, the "call bookstore" icon 130, the "connect to PC" icon 1321, the "switch books" icon 134, the purge book" icon 136, an "exit" icon 137 and the "hide icons" icon 138. Each of the icons 120–138 represent additional functions provided by the portable display unit 32.

When the "mark page" icon 120 is selected, the portable display unit 32 marks the current page by displaying a marker tab on the page. In the event that the text 110 is not of a size that suits the user, the size of the font on text 110 is displayed and can then be enlarged or reduced. In this case, the "change font" icon 122 may be selected so as to change the current font size to the next font size in a pre-determined series of fonts, ranging in order from a small font to a large font. Each time the switch 65 corresponding to icon 122 is pressed, (or, in an embodiment using a touch-sensitive display screen, when the icon 122 is pressed by the user) the font will switch to the next pre-determined font size. For the larger font sizes, an "anti-aliased" display technique may be used to provide character smoothing. Examples of such an "anti-aliased" display technique includes that described in U.S. Pat. No. 5,233,334, entitled "Text Display Apparatus and a Method of Displaying Text" issued Aug. 3, 1993, and U.S. Pat. No. 5,305,428 entitled "Image Forming Apparatus" issued Apr. 19, 1994.

Figure 3C:
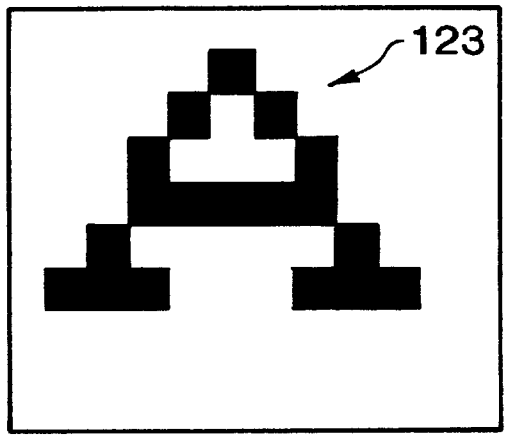
FIG. 3C illustrates an exemplary font 123 utilized by the portable display unit 32 of the present invention for displaying text.

In the preferred embodiment, the font used to display the text 100 is designed to provide maximal reading clarity by utilizing the individual pixels of the display screen 60 in an optimal manner as shown by the font 123 in FIG. 3C. This is unlike typical screen displays which use "What You See Is What You Get (WYSIWYG)" technology to represent as best as possible what the text 100 will look like when printed. In addition, a word, sentence or image denoted in bold or otherwise altered in form, can have a "warm link" associated with it. If this link is activated by means of the pen 63 or a switch 64 which corresponds to be "warm link" function, then the next time the portable display unit 32 is on-line with the host computer 16, it can quickly jump the display page 60 that this link points to.

Figure 4A:
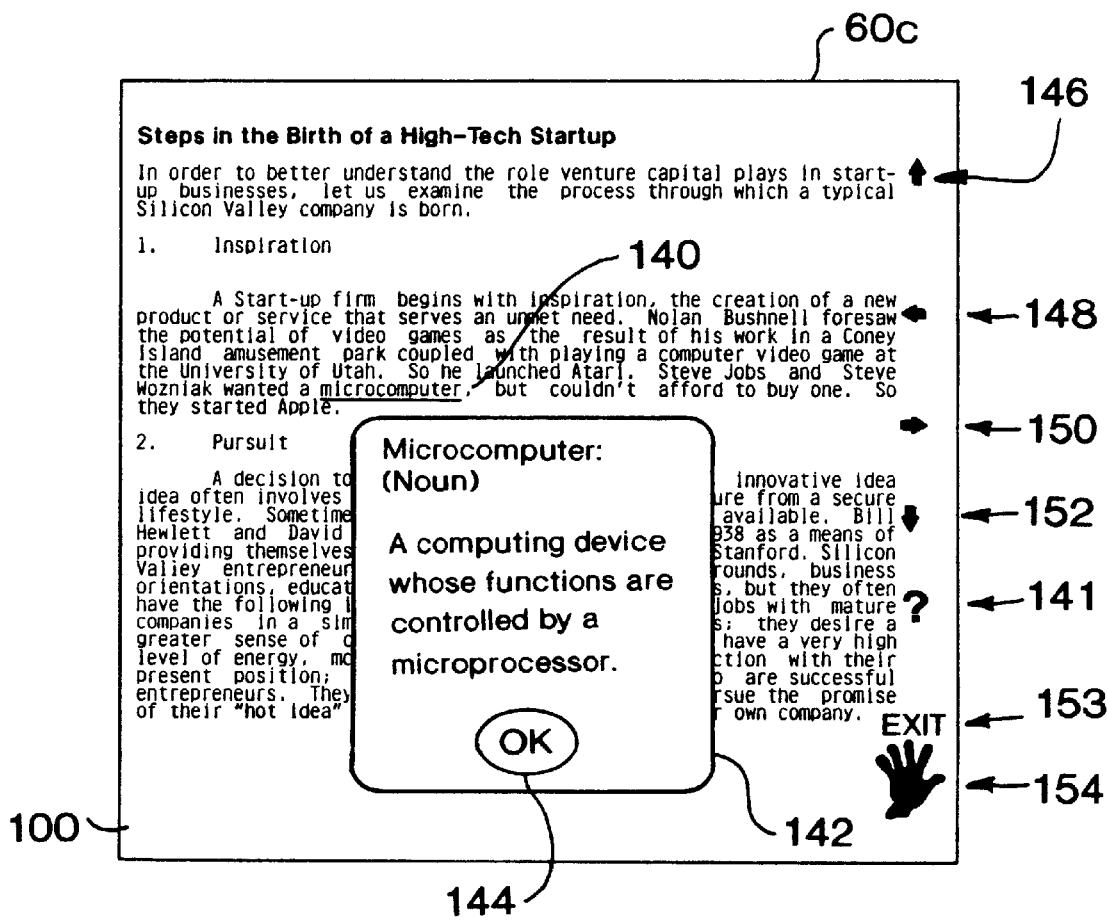
FIGS. 4A–4H illustrate additional exemplary display pages 60c–60h corresponding to additional features provided by the portable display unit 32 of the present invention.

FIGS. 4A–4F are exemplary display pages 60c–60h corresponding to other features of the portable display unit 32. In particular, FIG. 4A illustrates an exemplary display page 60c which is displayed when the "dictionary" icon 124 as shown in FIG. 3B is selected. The portable display unit 32 includes the ability to automatically look up and display the dictionary definition of a word 140 in the text 100. When the user desires to look up a word 140, the "?" icon 141 is selected. When this occurs, the CPU 80 looks up the word 140 in the dictionary 82d located in ROM 54 (see FIG. 2B) and the display 60 shows the definition in a window 142 that the user can remove by selecting an "OK" icon 144, or waiting for a pre-determined amount of time to pass.

If the word 140 is not in the dictionary 82d, the CPU 80 can look in the supplemental word list 84e located in NVRAM 84 for a definition. This supplemental word list 84e located in NVRAM 84 is downloaded with the text 100, and provides words that are pre-determined to be absent in the resident dictionary 84e located in ROM 82d.

The display page 60c further includes a number of icons 146–152 which may be used to move the cursor up a line, to move the cursor to the left by a word, to over the cursor to the right by a word or to move the cursor down by a line, respectively. It also includes an "exit" icon 153 which when selected, facilitates exiting from the current page. In addition, the display page 60c also displays a "hide icons"

icon 154, which when selected, hides all the icons 141, 146–154 displayed on the page 60c.

Figure 4B:
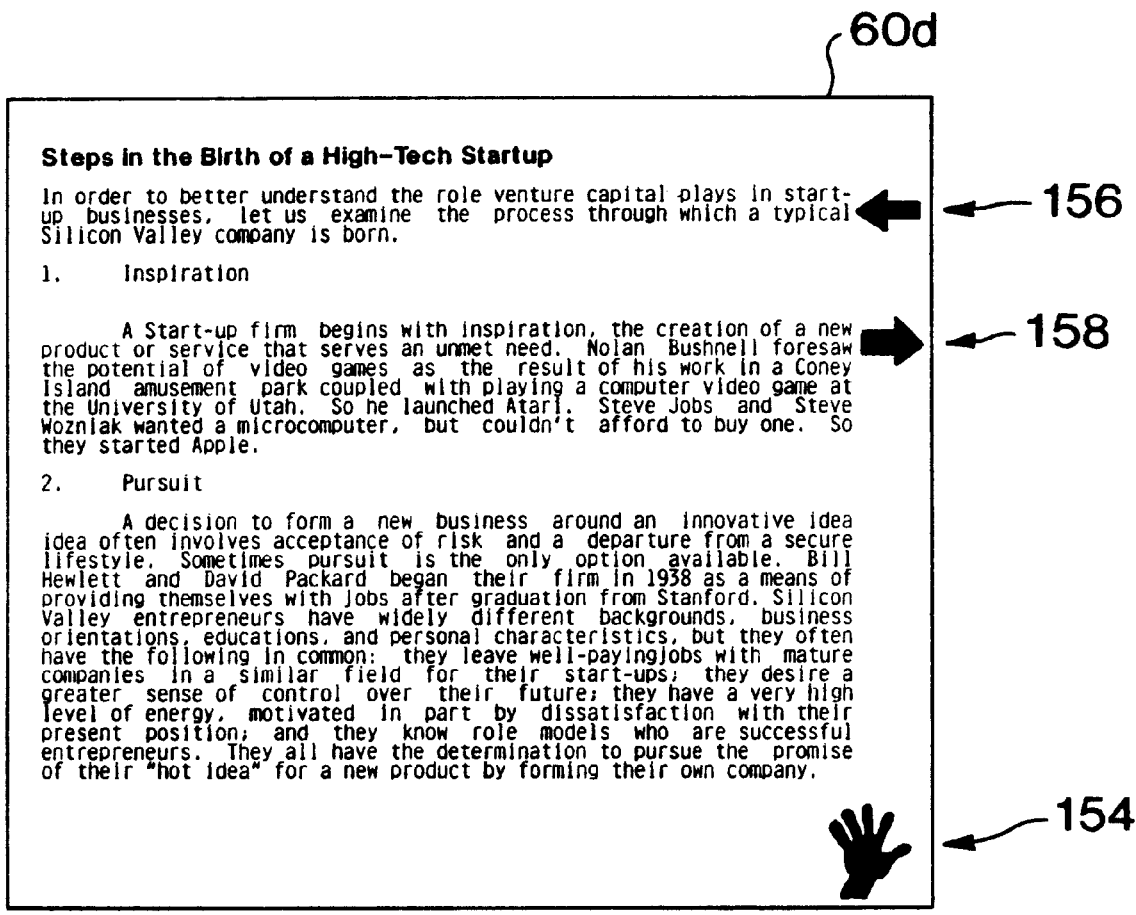

FIG. 4B illustrates a another exemplary display page 60d provided on display screen 60 of FIGS. 2A and 2B when the "underline" icon 128 as shown in FIG. 3B is selected. As shown, the display screen 60 provides display page 60d which displays two icons, namely, the "underline last sentence" icon 156 and "underline next sentence" icon 158, which allow the user to move forward or backward through the text, underlining selected one sentence at a time, respectively. The "hide icons" icon 154 is also displayed. A sentence can also be underlined by "stroking" the display screen 60 by touch or with the pen 63 (when available). In a further embodiment, an additional function for automatically skipping forward (or backwards) to the next (or previous) page with some underlining or highlighting on it, may be provided.

Figure 4C:
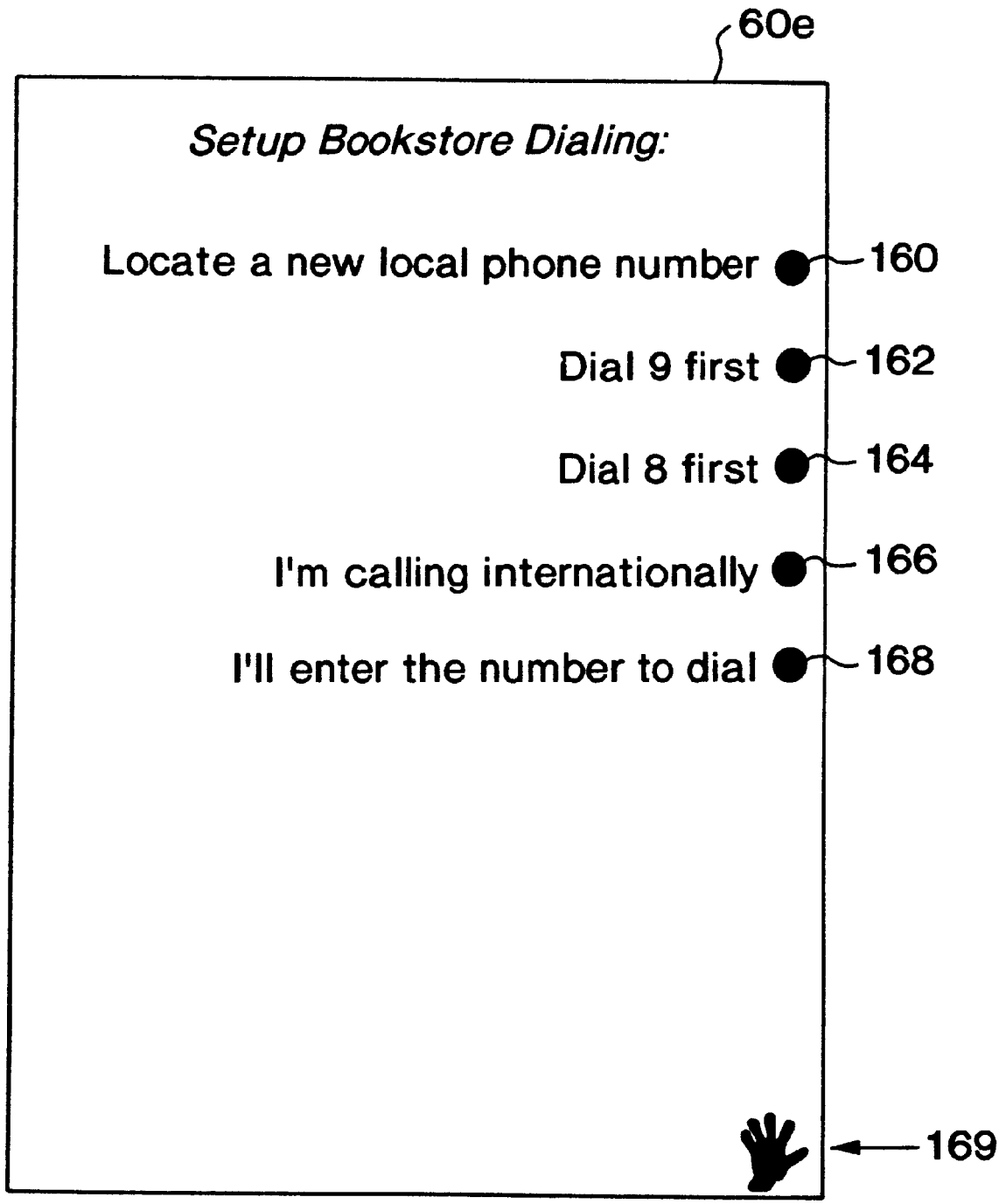

FIG. 4C illustrates an exemplary display page 60e, which is displayed on display screen 60 of FIGS. 2A and 2B when the "call bookstore" icon 130 as shown in FIG. 3B is selected. As shown the display page 60e provides icons 160–169 for: locating a new local phone number, dialing 9 first, dialing 8 first, calling internationally, entering the number to dial and to hide the icons on the display page 60e, respectively.

Figure 4D:
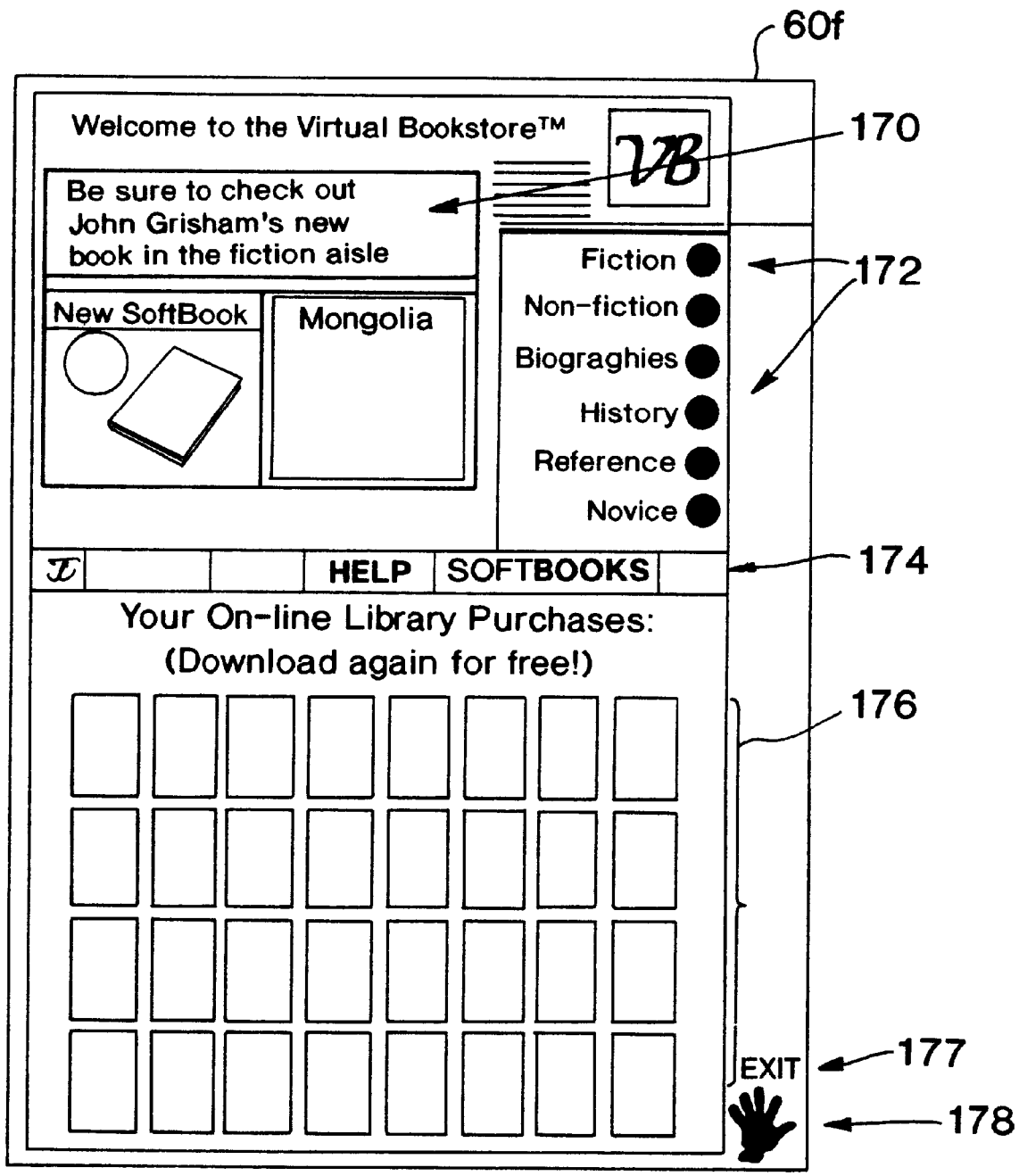

FIG. 4D illustrates an exemplary display page 60f, which is displayed on display screen 60 of FIGS. 2A and 2B upon engaging a bookstore number as shown in FIG. 4C. Once a telephone number for a virtual bookstore has been selected and communications is established, the portable display unit 32 displays a display page 60f which provides an overview of the features available from a particular virtual bookstore. The display page 60f includes a window 170 which provides online advertising, and icons 172 which enable the user to select from major section listings such as fiction, non-fiction, biographies, history, reference, business materials and electronic magazines or newspapers. An "optional features" icon 174 is also provided for providing additional features. In addition, a plurality of windows 176 display the personal bookshelf titles of books already purchased by the user. An "exit bookstore" icon 177 allows the user to exit this page 60f when selected, while a "hide icons" icon 178 allows the user to hide the displayed icons.

Figure 4E:
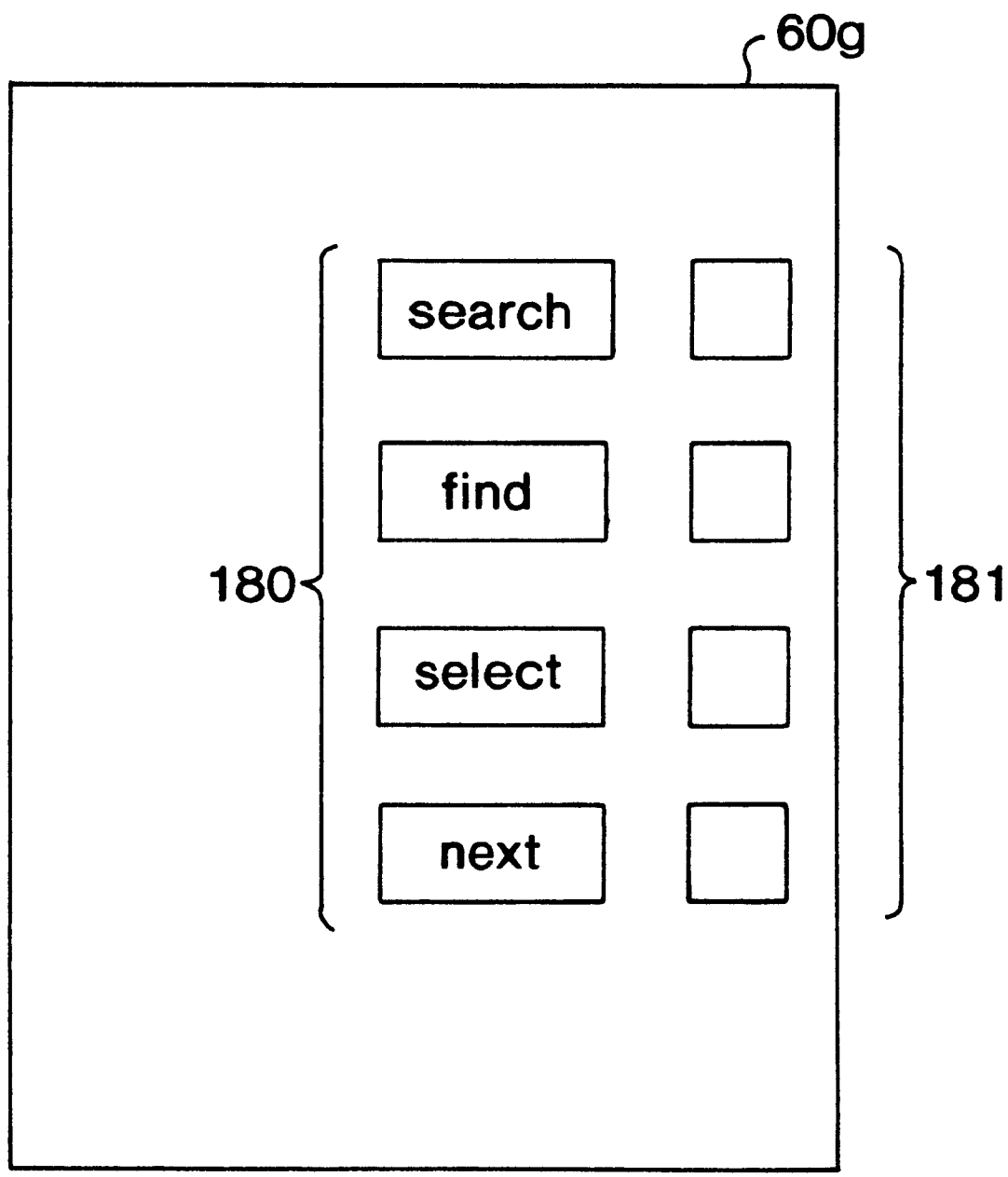

FIG. 4E illustrates an exemplary display page 60g, which is displayed on display screen 60 of FIGS. 2A and 2B when the "connect to PC" icon 132 as shown in FIG. 3B is selected. This feature includes the ability to "navigate" the content database 18 of FIG. 1 connected to the host computer 16. A display page 60g provides a plurality of commands 180 corresponding to icons 181. By selecting among these commands 181, the user can have information displayed on display page 60g which enables them to view information about the content database 18, and facilitate selection, purchasing and downloading.

Figure 4F:
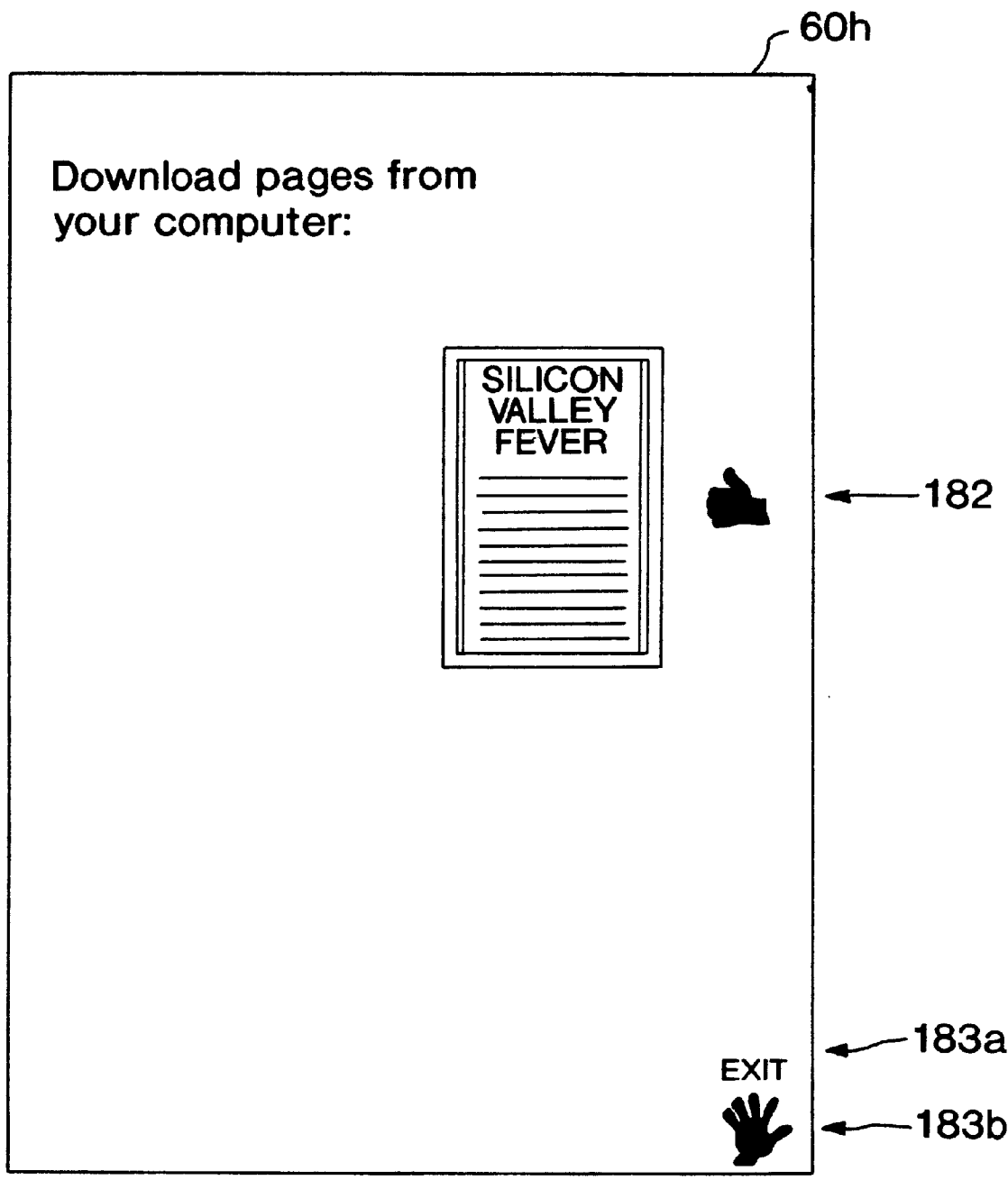

FIG. 4F illustrates an exemplary page 60h, which is displayed on display screen 60 of FIG. 2A and 2B when the "connect to PC" icon S132, as shown in FIG. 3B, is selected. In addition, the display page 60h displays a "start downloading" icon 182, which when selected, enables the portable display unit 32 to proceed downloading of selected pages from the computer 44 of FIG. 1. A "hide icons" icon 183a is also included for hiding the icons displayed and an "exit" icon 183b permits the user to exit from this feature when selected.

Figure 4G:
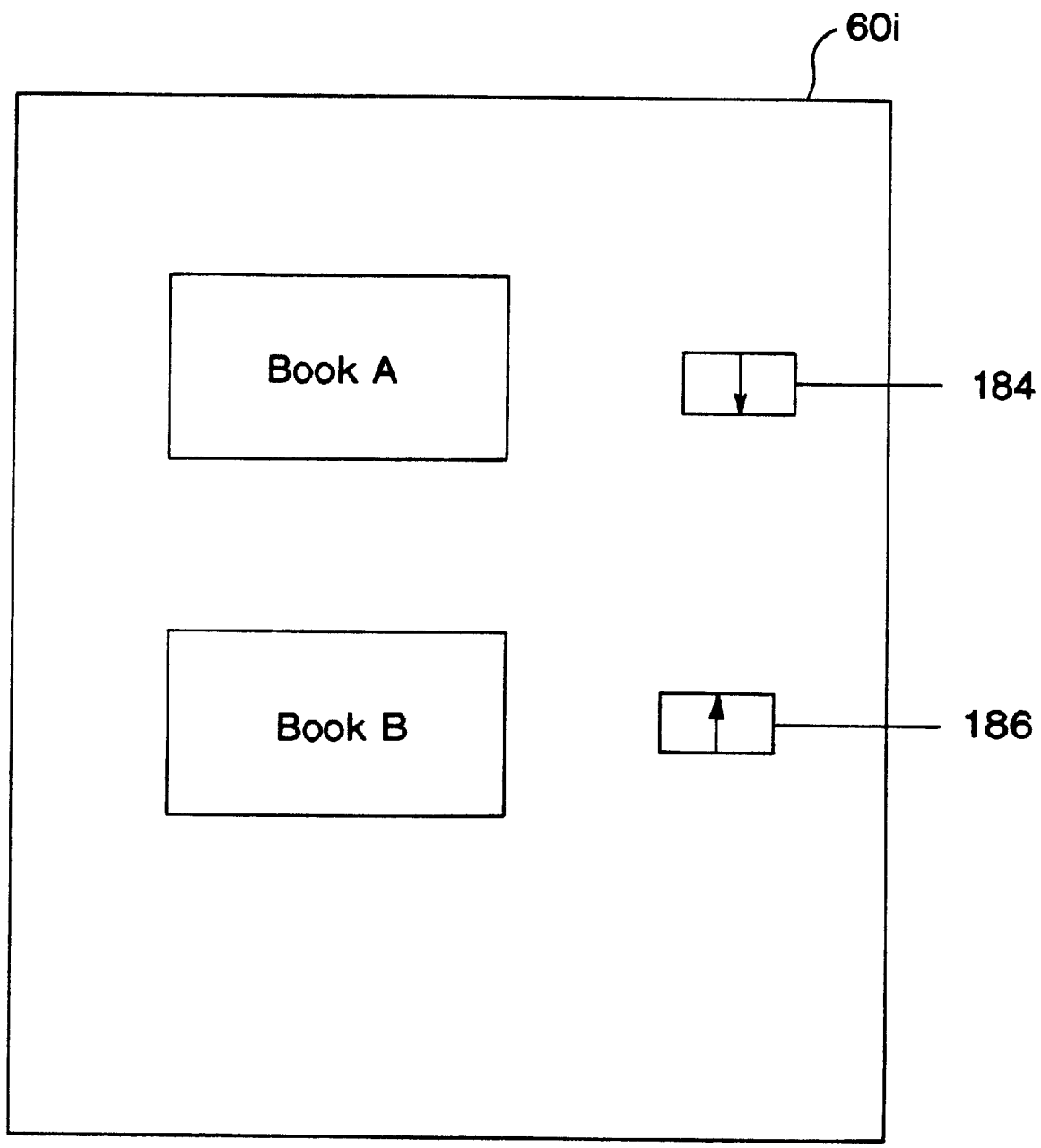

FIG. 4G illustrates an exemplary display page 60i, which is displayed on display screen 60 of FIGS. 2A and 2B when the "switch books" icon 134 as shown in FIG. 3B is selected. As shown, the display page 60i enables the user to switch from book A to book B by selecting icons 184 or 186 respectively.

Figure 4H:
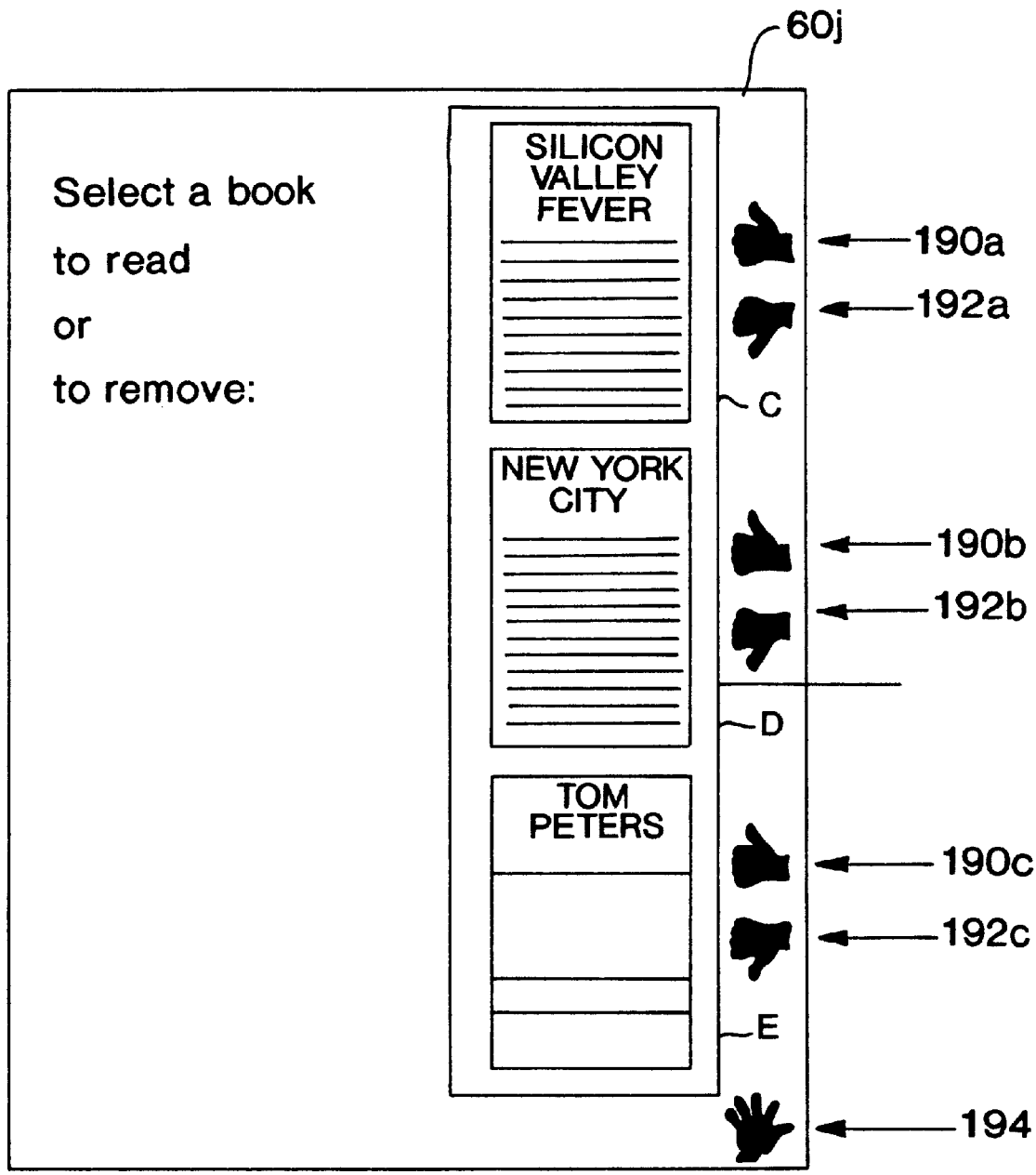

FIG. 4H illustrates an exemplary display page 60j which is displayed on display screen 60 of FIGS. 2A and 2B when the "purge book" icon 136 as shown in FIG. 3B is selected. As shown, the display page 60j enables the user to select a book to read or to remove. A number of books, for example, books C, D, E are displayed on display page 60j. Adjacent to each book C, D or E are two icons 190 and 192, which when selected will respectively keep the book C, D or E, or purge the book C, D or E displayed. Icon 194 allows the displayed icons to be hidden.

Figure 5A:
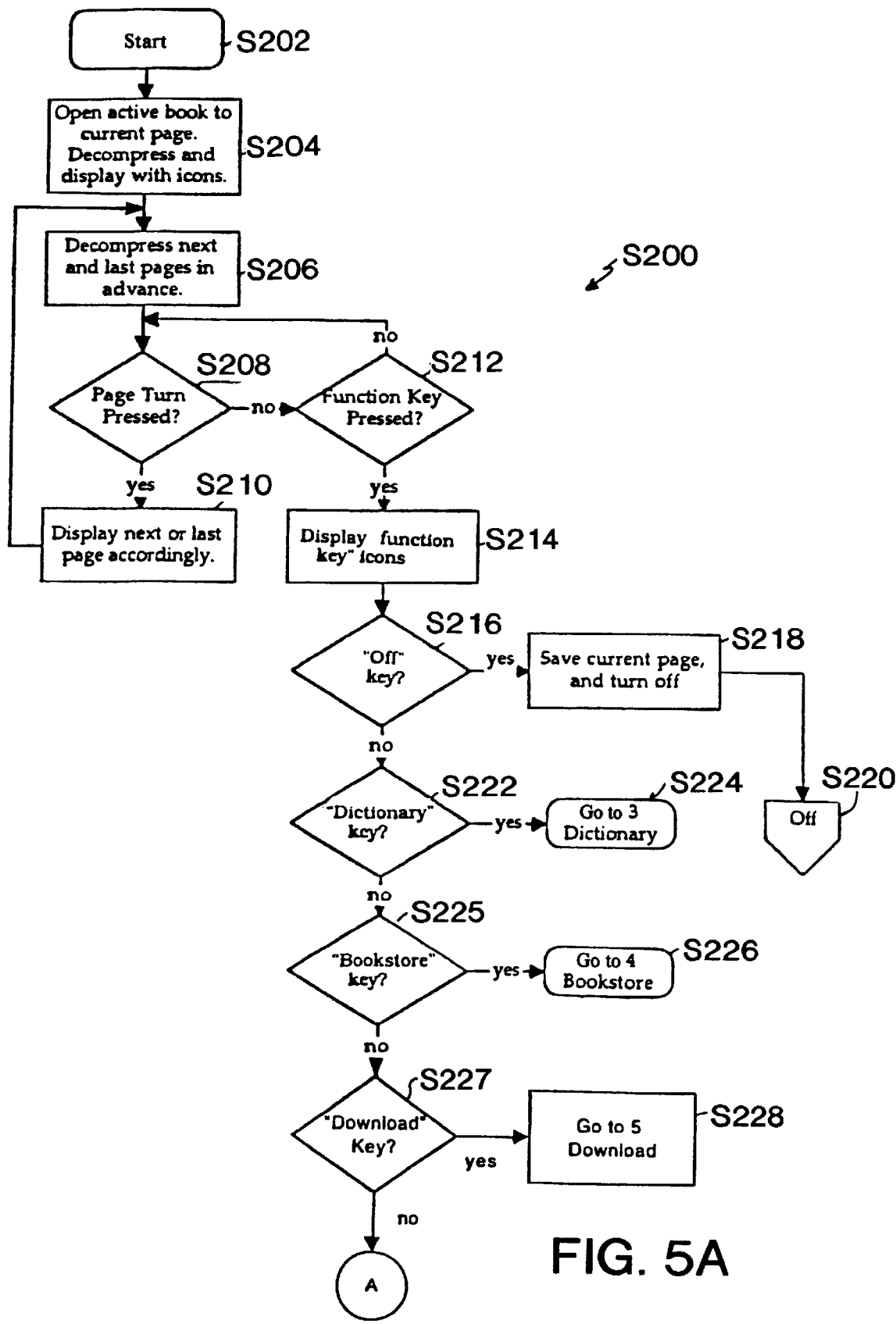
FIGS. 5A and 5B are flowcharts illustrating the main process S200 of viewing electronic reading materials as utilized by the publication and distribution system 10 of the present invention.
Figure 5B:
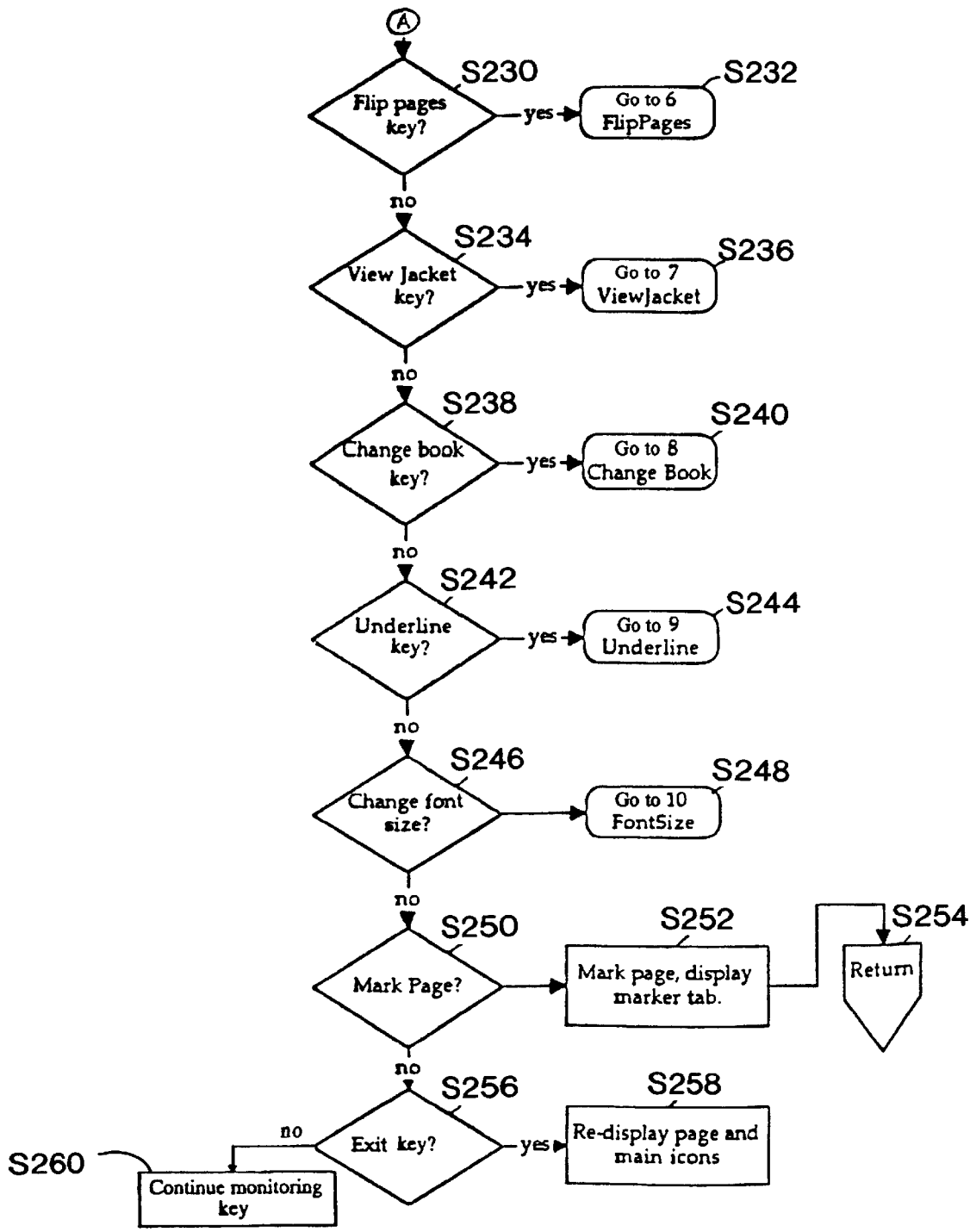

FIG. 5A is a flowchart illustrating the process S200 of viewing electronic reading materials as utilized by the portable display unit 32 of the present invention. The process S200 begins from a start state S202, the process S200 proceeds to process step S204 where the process S200 opens an active book to a selected or a current page in accordance with user selection. The data for the active book is decompressed by the portable display unit 32 and displayed, along with icons representing the functions available. The process S200 then proceeds to process step S206, where it decompresses the next and last pages of the active book in advance. The process S200 then proceeds to decision step S208 to query if the switch corresponding to the "page turn" icon 104, as shown in FIG. 3A, has been selected. If so, the process S200 proceeds to process step S210, where it displays the next or the last page, as selected by the user. The process S200 then returns to process step S206. If the "page turn" icon 104 (FIG. 3A) has not been selected, the process S200 proceeds to decision step S212 to query if the "display function icons" key 108 (FIG. 3A) has been pressed. If not, the process S200 returns to decision step S208. However, if the "display function icons" key 108 has been pressed, the process S200 proceeds to process step S210, where it displays the function key icons.

Next, the process S200 proceeds to decision step S216, where it determines if the "off" key 66 (FIG. 2A) has been pressed. If so, the process proceeds to process step S218, where it saves the current page and turns off the portable display unit 32. The process S200 then terminates at process step S220. If the "off" key 66 has not been pressed, the process S200 proceeds to decision step S224, where it determines if the "dictionary" key 126 (FIG. 3B) has been pressed. If so, the process S200 proceeds to process step S224, which is a sub-process for providing the dictionary features of the portable display unit 32.

If the "dictionary" key 126 has not been selected, the process S200 proceeds to decision step S225, where it determines if the "call bookstore" key 130 (FIG. 3B) has been selected. If so, the process S200 proceeds to process step S226, which is a sub-process for providing the call bookstore features of the portable display unit 32. If the "call bookstore" key 130 has not been selected, the process S200 proceeds to decision step S227, where it determines if the "download" key 182 (FIG. 4F) has been selected. The "download" key 182 may be implemented on the main display page 60b (FIG. 3B) or on another display page such as that shown in FIG. 4F. If the process S200 determines that the "download" key 182 has been pressed, it proceeds to subprocess S228. If not, it proceeds to decision step S230, where it determines if the "flip pages" key 124 (FIG. 3B) has been selected. If so, the process S200 proceeds to process step S234, which is a sub-process for providing the "flip pages" features of the portable display unit 32.

If the "flip pages" key 124 (FIG. 3B) has not been selected, the process S200 proceeds to decision step S234, where it determines if the "view jacket" key (not shown in FIG. 3B) has been pressed. If so, the process S200 proceeds to process step S236, which is a sub-process for providing the "view jacket" features of the portable display unit 32. If the "view jacket" key has not been selected, the process S200 proceeds to decision step S238.

At decision step S238, the process S200 determines if the "change book key" (not shown in FIG. 3B) has been pressed. If so, the process S200 proceeds to process step S240, which is a sub-process for providing the "change book" features of the portable display unit 32. If the "change book" key has not been selected, the process S200 proceeds to decision step S242, where it determines if the "underline" key 128 (FIG. 3B) has been pressed. If so, the process S200 proceeds to process step S244, which is a sub-process for providing the "underline" features of the portable display unit 32. If not, the process S200 proceeds to decision step S246, where it determines if the "change font size" key 122 (FIG. 3B) has been depressed. If so, the process S200 proceeds to process step S248, which includes a sub-process for providing the "font size" features of the portable display unit 32.

If the "change font size" key 122 (FIG. 3B) has not been selected, the process S200 proceeds to decision step S250 to determine if the "mark page" key 120 (FIG. 3B) has been pressed. If so, the process S200 proceeds to process step S252, where it marks the page and displays the marker tab.

The process S200 then returns to the start state S202. If the "mark page" key 120 (FIG. 3B) has not been selected, the process S200 proceeds to decision step S256, where it determines if the "exit" key 137 (FIG. 3B) has been depressed. If so, the process S200 proceeds to process step S258, where it re-displays the page and main icons. If the "exit" key 137 has not been selected, the process S200 proceeds to process step S260, where it continues to monitor the selection of the various keys representing the features of the display portable device 32.

Figure 6A:
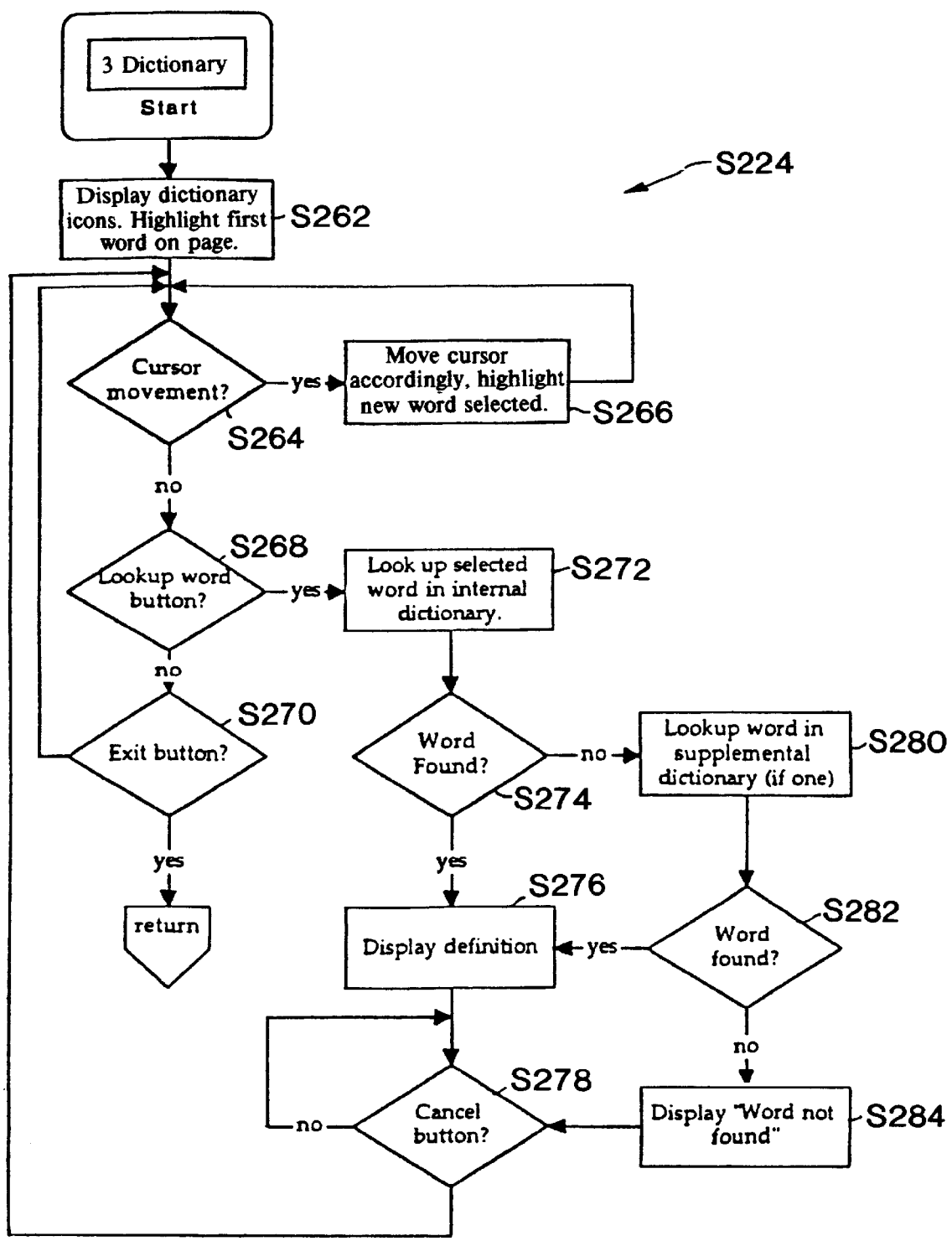
FIGS. 6A–6H are flowcharts illustrating the subprocesses S224, S226, S228, S232, S236, S240, S244 and S248, shown in FIGS. 5A and 5B.

As shown in FIG. 6A, the process S224 begins with start state and proceeds to process step S262 where the dictionary icons are displayed. The first word on the display page is highlighted. The process S224 then proceeds to decision step S264, where it determines if there is cursor movement. If so, the process S224 proceeds to process step S266 where the cursor is moved accordingly and the new word selected is highlighted. The process S224 then returns to decision step S264. If there is no cursor movement, the process S224 proceeds to decision step S268 where the process S224 determines if the lookup word icon 141 (FIG. 4A) has been selected. If not, the process S224 proceeds to decision step S270 where it queries if the exit icon 153 (FIG. 4A) has been selected. If not, the process S224 returns to decision step S264. If the exit icon 153 has been selected, the process S224 terminates. If the process S224 determines that the lookup word has been selected in decision step S268, the proceeds to process step S272, where it lookups the selected word in the internal dictionary. The process S224 then proceeds to decision step S274 where it determines if the word has been found. If so, the process S224 proceeds to process step S276 where it displays the definition of the words selected.

Next, the process S224 proceeds to the decision step S278, where it determines if the cancel icon 144 (shown as an "OK" icon in FIG. 4A) has been selected. If not, the process S224 proceeds to return to decision step S270, where it continues to determine if the exit icon 144 has been selected. If the exit icon 144 has been selected, the process S224 proceeds back to decision step S264. If the process S224 determines that the word selected to be looked-up in the internal dictionary has not been found in decision step S274, the process S224 proceeds to process step S280, where it looks up the word in the supplemental dictionary. It then proceeds to decision step S282, where it queries if the word has been found. If so, it proceeds to process step S266, where the definition is displayed. If not, the phrase "Word Not Found" is displayed on the display page, as shown in process step S284 and the process S224 then proceeds to decision step S278, where it continues to monitor if the cancel icon has been selected.

Figure 6B:
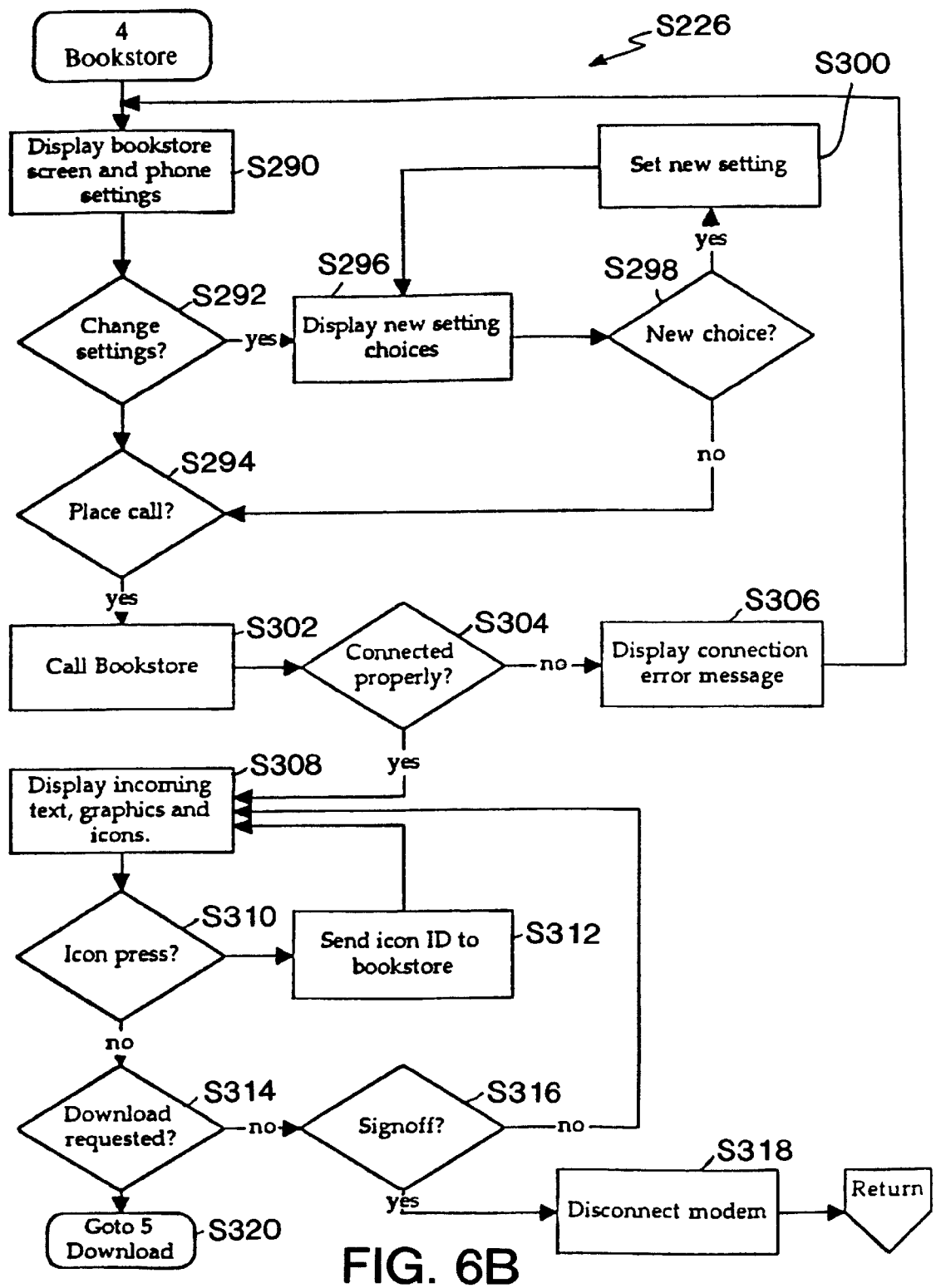

Beginning from the start state, as shown in FIG. 6B, the process S226 proceeds to process step S290, where the process S226 displays the "call book store" display page (see FIG. 4C) in telephone settings. The process S226 then proceed to proceeds to decision step S292, where it queries if the settings should be changed. If not, it proceeds to decision step S294, where it queries if a call should be placed. If it is determined in decision step S292 that a setting has to be changed, then the process S226 proceeds to process step S296, where the new settings choices are displayed. The process S226 then proceeds to decision step S298, where it queries if a new choice has been selected. If so, the process S226 proceeds to process step S300, where the new setting is set. The process S226 then returns to process step S296. If the process S226 determines a decision step S298 that a new choice has not been selected, it proceeds back decision step S294.

At decision step S294, the process S226 queries if a call should be placed. If not, the process S226 proceeds back to decision step 294 and continues to monitor if a call should be placed. If at decision step S294, it is determined that a call should be placed, the process S226 proceeds to process step S302, where the book store is called. The process S226 is then proceeds to decision step S304, where it queries if it has been connected properly. If the connection has been properly placed. If not, the process S226 proceeds to process step S306, where the connection error message is displayed. The process S226 then proceeds back to process step S290. If a proper connection has been established, the process S226 proceeds to process step S308, where the incoming text, graphics, and icons are displayed on the display page. The process S226 then proceeds to decision step S310, where it queries if an icon has been selected. If so, the process S226 proceeds to process step S312, where it sends the identification of the icon to the book store. The process S226 then returns to process step S308. If an icon has not been selected, the process S226 proceeds to decision step S314, where it queries if downloading has been requested. If not, the process S226 queries if it should sign off. If not, the process S226 proceeds back to process step S308, where it continues to display incoming text, graphics and icons. If the process S226 determines at decision step S316, it should sign off, then it proceeds to disconnect the modem connection at step S318 and then it terminates. If at decision step S314, the process S226 determines that downloading has been requested, the process S226 proceeds to process step S320.

Figure 6C:
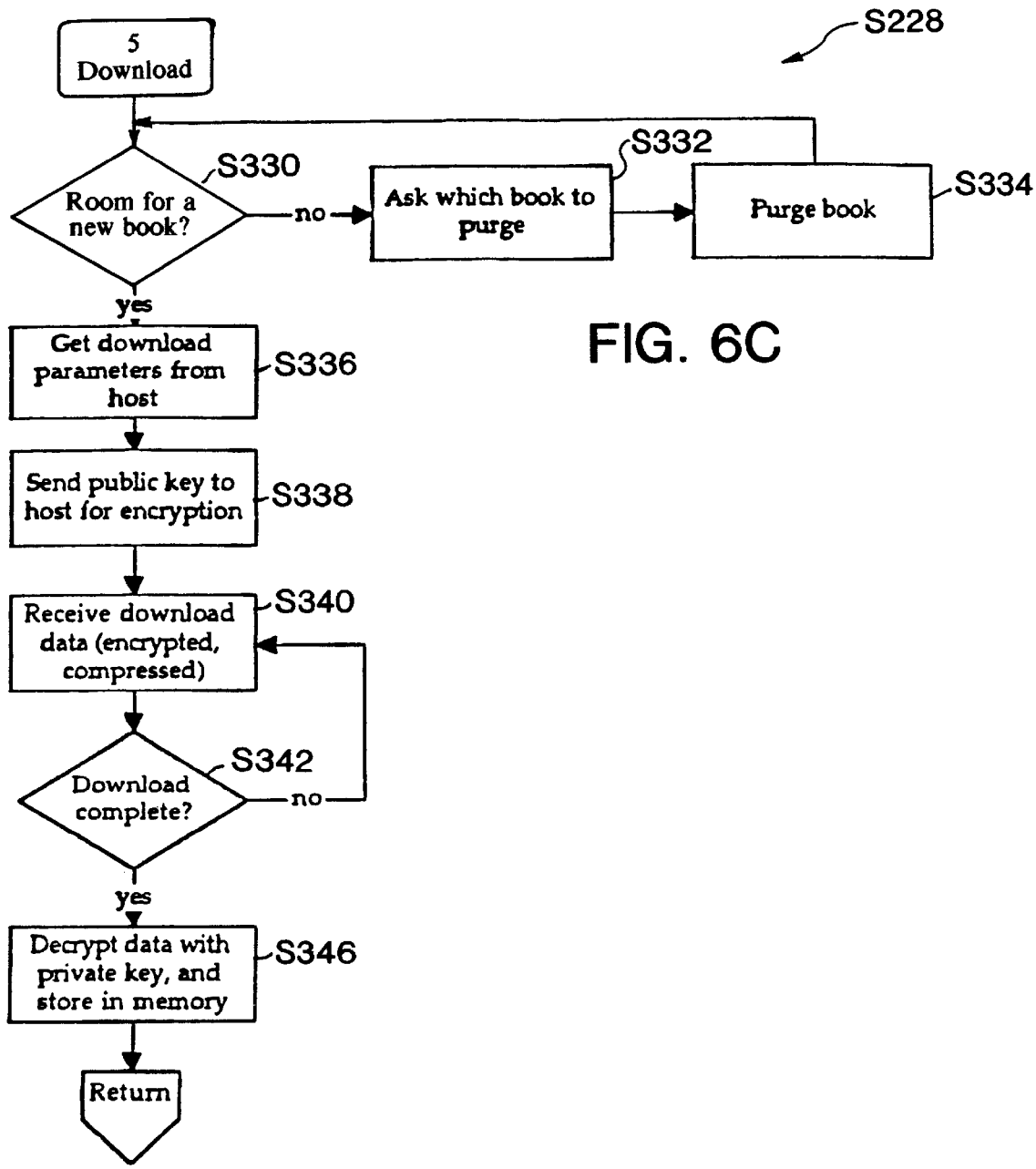

As shown in FIG. 6C, the process S228 begins from the start state and proceeds to decision step S310, where it queries if there is room for a new book. If not, the process S228 proceeds to process step S332, where it determines which book is to be purged (see FIG. 4H). The process S228 then proceeds to process step S334, where it purges the book selected and then proceeds back to decision step S330, where it queries if there is room for a new book. If at decision step S330, the process S228 determines that there is room for a new book, it proceeds to process step S336, where it obtains the download parameters from the host computer. Next, the process S228 sends the public key to the host computer for encryption as shown in process step S338. The process S228 then receives download data that has been encrypted and compressed as shown in process step S340 and then proceeds to decision step S342, where it queries if downloading is complete. If not, the process continues back to process step S340, where it continues to receive download data. If at decision step S342, the process S228 determines that downloading is complete, the process S228 proceeds to process step S342, where it equips the data with a private key and stores the data in memory. The process S228 then terminates.

Figure 6D:
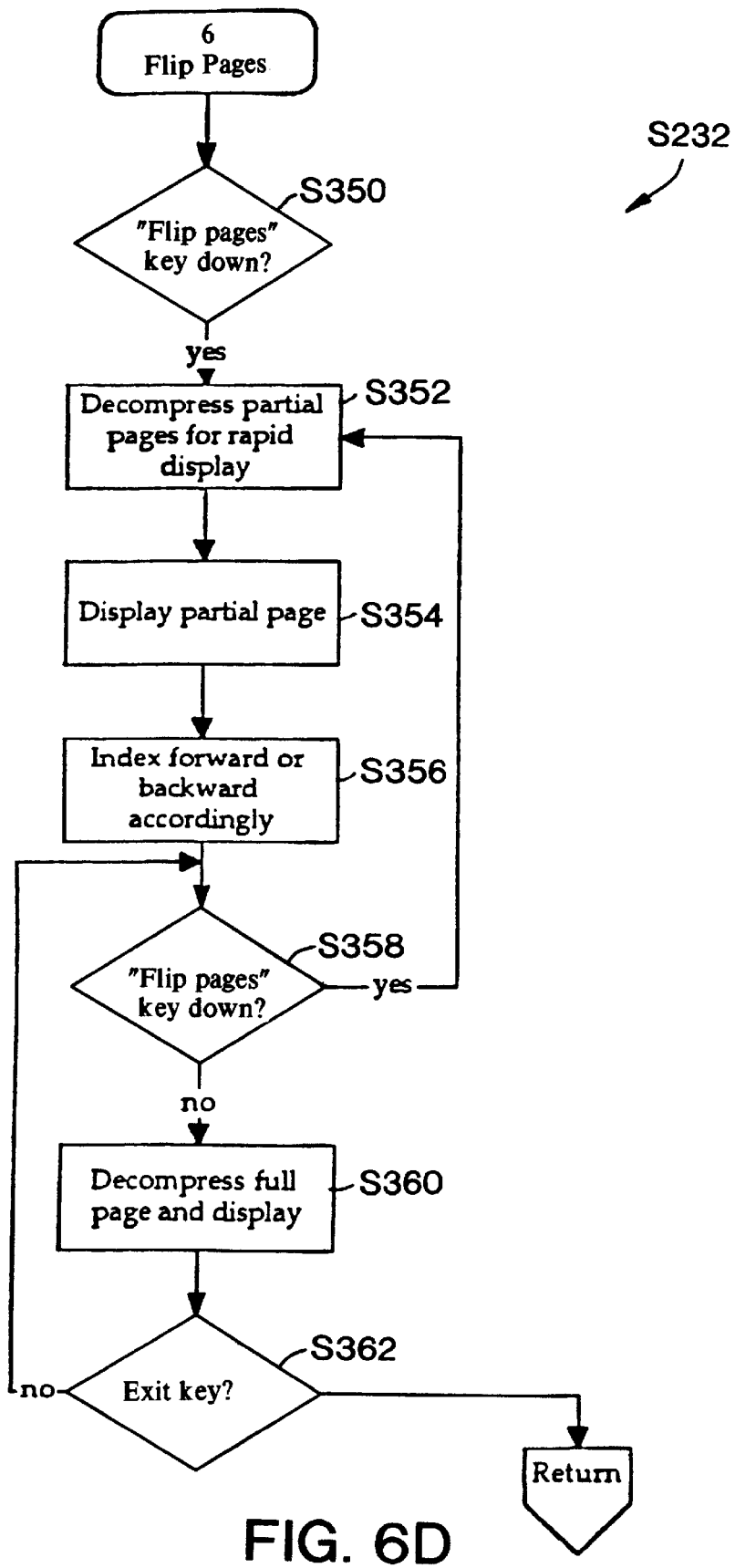

Beginning from a start state, as shown in FIG. 6D, the process S232 proceeds to decision step S350, where it queries if the "flip pages" icon 124 (FIG. 3B) has been selected. If so, the process S232 proceeds to process step S352, where it decompresses partial pages for rapid display. If the "flip pages" icon 124 has not been selected, the process S232 continues to monitor the "flip pages" icon 124 by returning to decision step S350. Proceeding from process step S352, the process S232 displays the partial page, as shown in process step S354. Next, the process S232 proceeds to process step S356, where it indexes forward or backward queries in accordance to the pages selected. The process S232 then proceeds to decision step S358, where it queries if the "flip pages" icon 124 is selected. If so, the process S232 proceeds back to process step S352. If not, the process S232 proceeds to process step S360, where it decompresses the full page and displays the text. The process S232 then proceeds to decision step S362, where it queries if the exit icon has been selected. If not, the process S232 proceeds back to decision step S358,, where it continues to monitor the foot key. If at the decision step S362 the exit icon has been selected, the process S232 terminates.

Figure 6E:
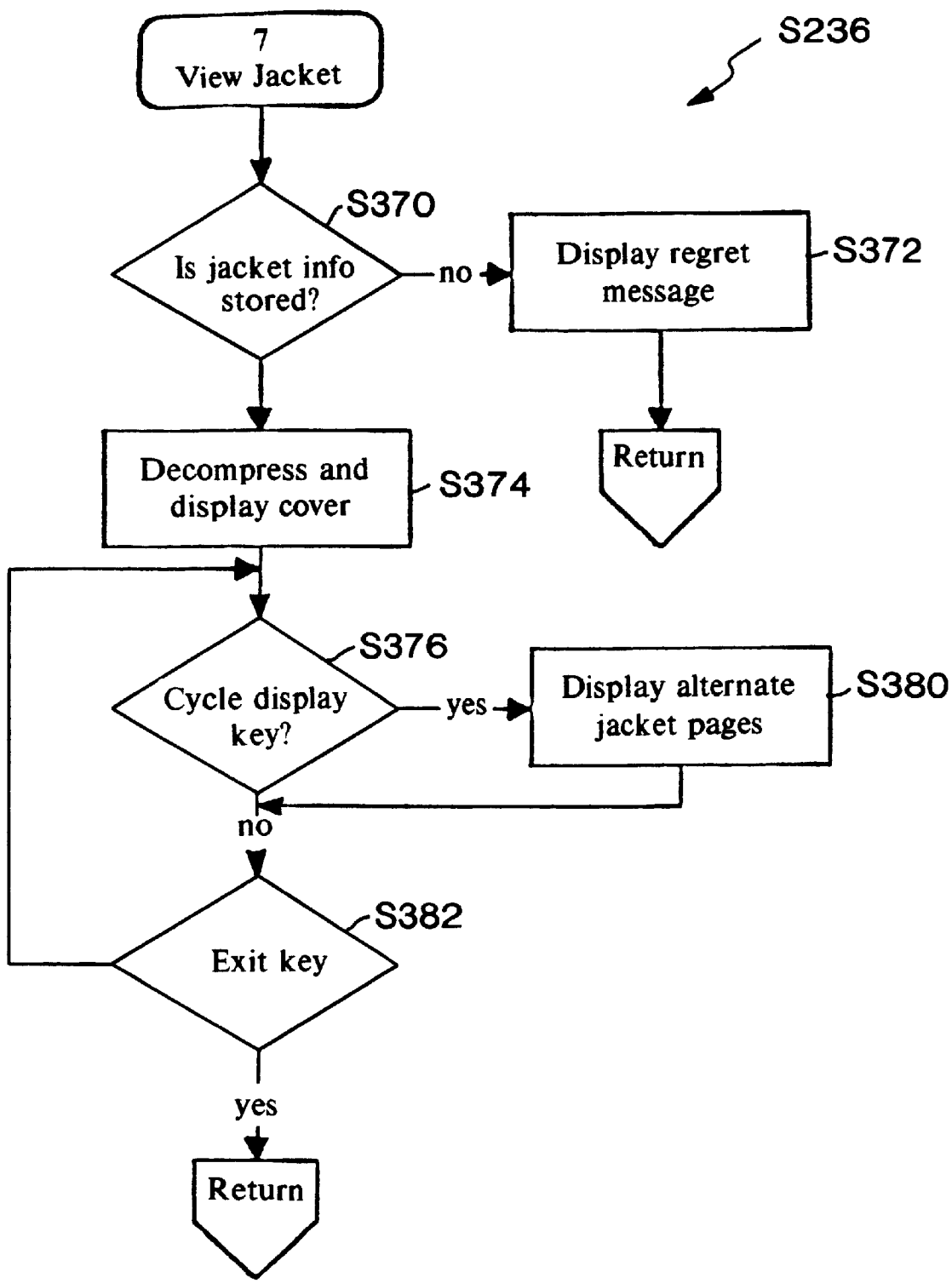

Beginning a start state, as shown in FIG. 6E, the process S236 proceeds to decision step S370, where it queries if the jacket information is stored. If not, the process S236 proceeds to process step S372, where it displays a regret message and the process then terminates. If the jacket information is determined to be stored, the process S236 proceeds to process step S374, where it decompresses and displays the cover of the book selected. The process S236 then proceeds to decision step S376, where it queries if the display icon associated with the display of the cover of the book has been selected. If so, the process S236 proceeds to process step S380, where it displays alternate jacket pages, and then process S236 to decision step S382. If the cycle display icon has not been selected, the process S236 proceeds directly to decision step S382. At decision step S382, the process S236 queries if the exit icon has been selected. If not, the process S236 returns to decision step S736, where it continues to monitor if the cycle icon has been selected. If the exit icon has been selected, the process S236 terminates.

Figure 6F:
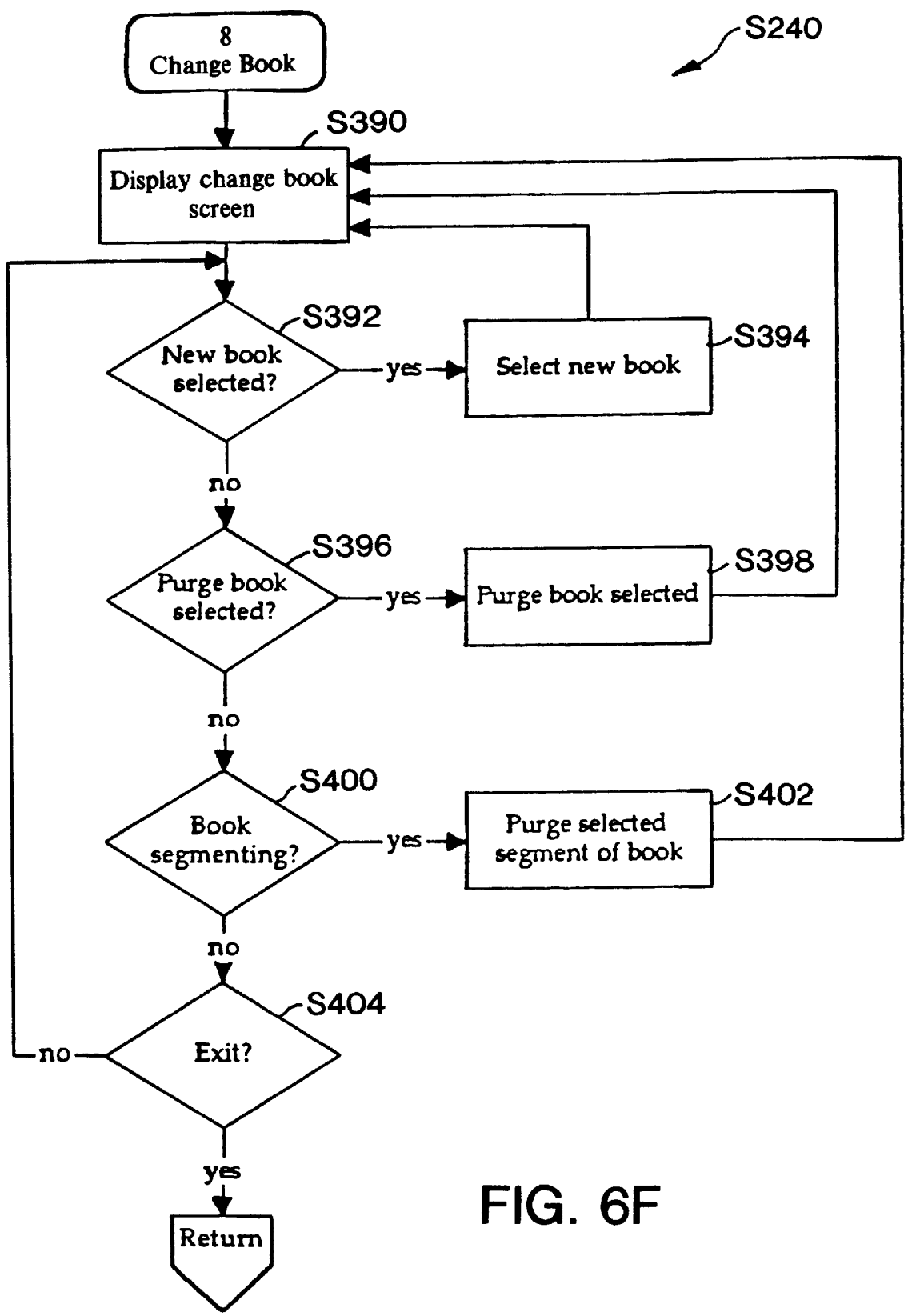

As shown in FIG. 6F, the process S240 begins from a start state and proceeds to process step S390, where it displays the change book display page (see FIG. 4G). The process S240 then proceeds to decision step S392, where it queries if a new book has been selected. If so, the process S240 proceeds to process step S394, where a new book is selected, and then returns to process step S390, where it displays the change book screen. If a new book has not been selected, the process S240 proceeds to decision step S396, where it queries if a purged book icon 192a, 192b, and 192c, has been selected. If so, the process S240 purges the book selected, as shown in process step S398, and then proceeds to process step S390. If the purged book icon (FIG. 14A) has not been selected, the process S240 proceeds to decision step S400, where it queries if "book segmenting" which purges selected segments of a book is selected. If so, the process purges the selected segment of the book, as shown in process step S402. The process S240 then proceeds back to process step S390. If book segmenting has not been selected to process the queries, the process S240 queries if the exit icon has been selected, as shown in decision step S404. If not, the process S240 proceeds back to decision step S392. If the exit icon has been selected, the process S240 terminates.

Figure 6G:
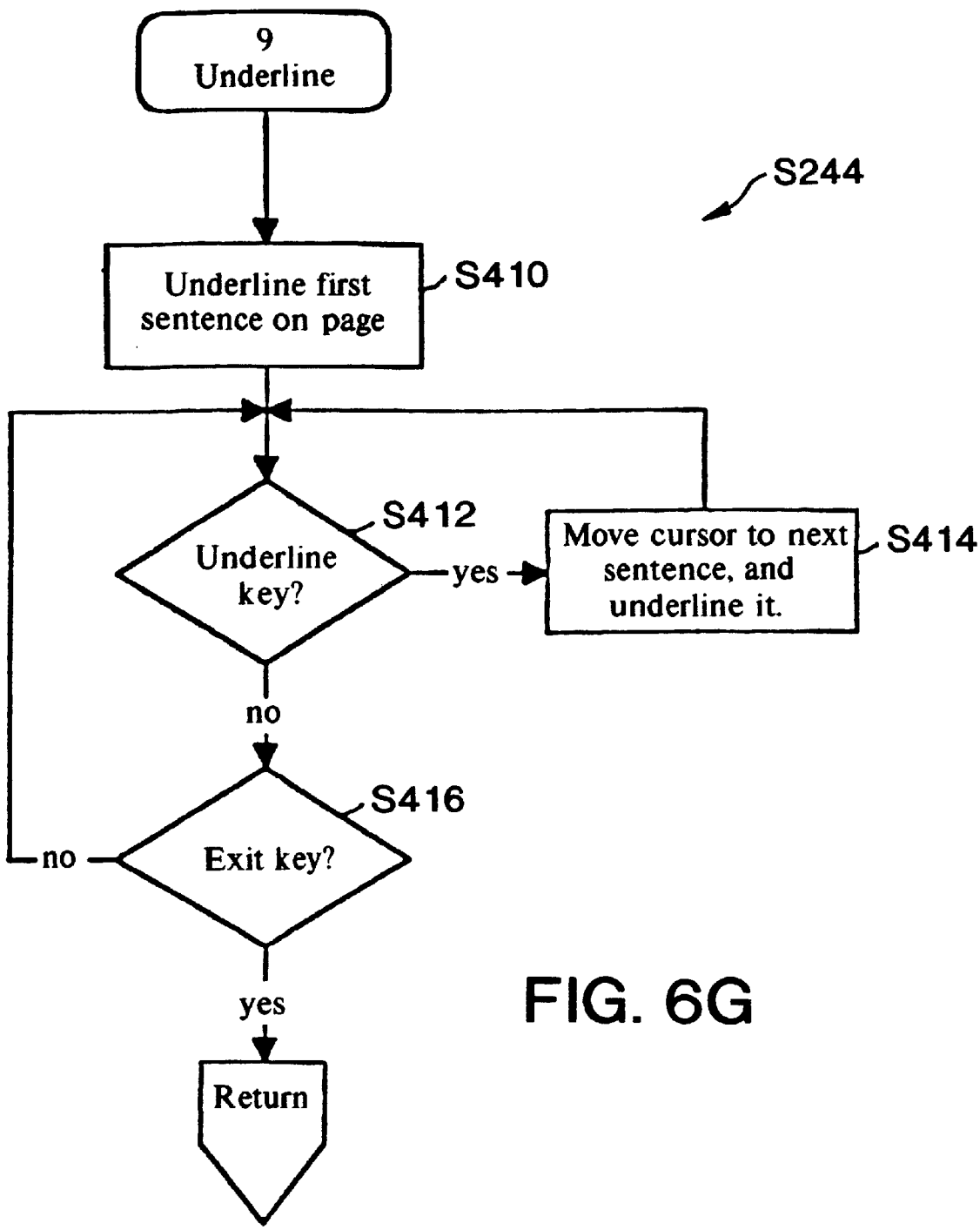

The process S244 begins from a start state as shown in FIG. 6G and then proceeds to process step S410, where it underlines the first sentence on the page (see FIG. 4B). The process S244 then proceeds to decision step S412, where it queries if the underlined icon has been selected. If so, the process S244 proceeds to decision step S414, where it moves the cursor to the next sentence and then underlines the next sentence. The process S244 proceeds back to decision step S412. If the underlined icon has not been selected, the process S244 proceeds to decision step S416, where it queries if the exit icon has been selected. If not, the process S244 returns to decision step S412. If the exit icon has been selected, the process S244 terminates.

Figure 6H:
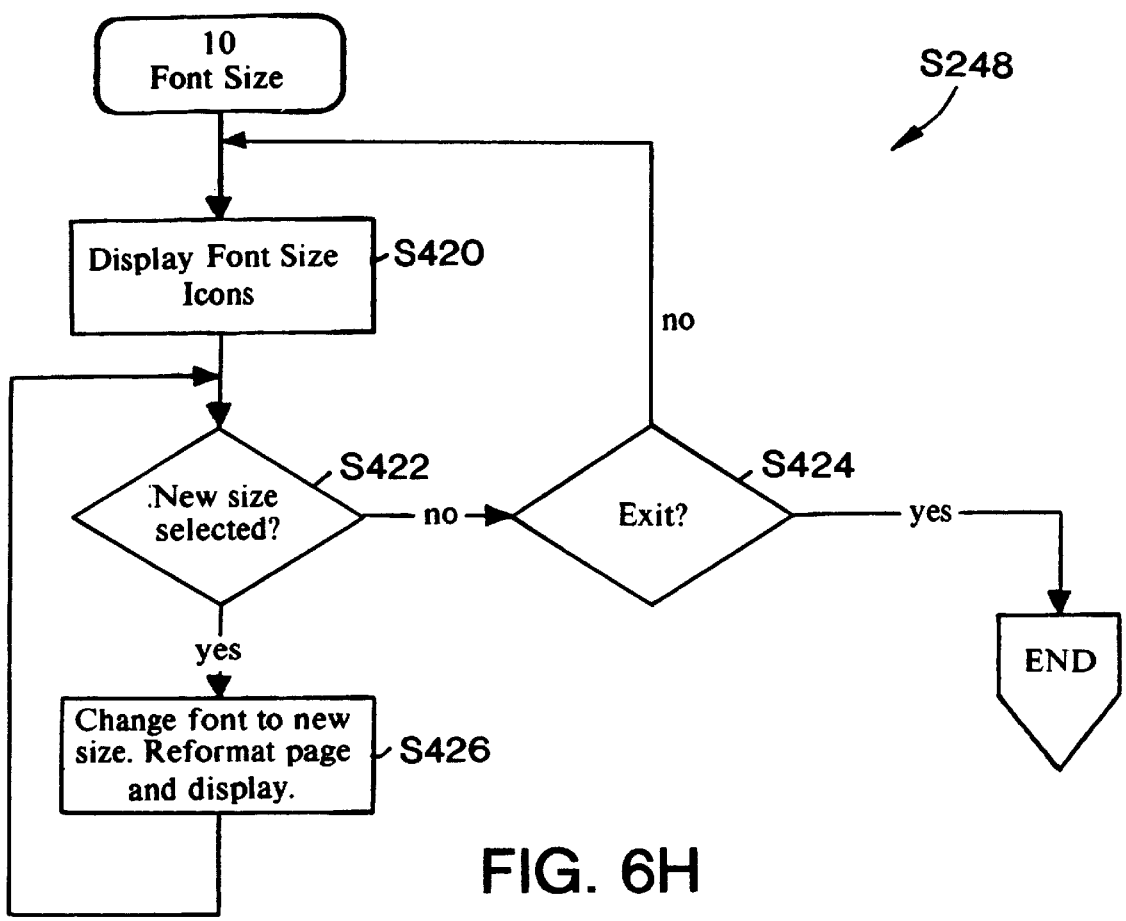

Beginning from a start state as shown in FIG. 6H, the process S248 proceeds to process step S420, where it displays the font size icons. The process S248 proceeds to decision step S422, where it queries if a new size has been selected. The process S248 then proceeds to process step S426, where it changes the font to the new size. The process S248 then reformats the page and displays accordingly. Then it proceeds back to decision step S422. If a new font size has not been selected, the process S248 queries if the exit icon has been selected. If not, it proceeds back to process step S420, where it displays the font size icons. If the exit icon has been selected, the process S248 terminates.

Through the use of the present invention, a publication "virtual bookstore" that allows for an effective manner of examining the contents according to individual interests, and selecting the material to download may be maintained. In addition, a portable display system that is compatible with the virtual bookstore, and the corresponding security and communication features is provided. Furthermore, a user interface in the portable viewer that facilitates the selection, navigation and manipulation of the published works as they are read is provided.

As a result, a system for retaining a library of publications and for selectively loading these publications into a portable viewer with non-volatile memory storage is provided. In addition, a secure communications system that permits downloading of copyrighted materials without concern for their proliferation through present on-line services is also provided.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A portable electronic book for retrieving textual information stored in a remotely located host computer and for displaying the retrieved textual information, the retrieved textual information including graphics and pictures, the portable electronic book comprising:

a housing including a display screen for displaying the retrieved textual information on display pages, the housing having a plurality of function keys corresponding to functions provided by the electronic book in retrieving and displaying the textual information, some of the functions being represented by icons displayed on a display page of the display screen, the icons displayed on the display page varying in accordance to the function selected;

memory for storing the retrieved textual information and information related to the icons for display on a display page, the memory storing a unique code number associated only with the electronic book; and a processor coupled to the memory and display screen for controlling the retrieval and display of the retrieved textual information, the processor receiving input from the function keys and for controlling the display of the icons on the display screen;

wherein the retrieved textual information is rendered readable by the unique code number, the retrieved textual information being readable only by the corresponding portable electronic book.

2. The portable electronic book of claim 1, further comprising a modem for retrieving textual information stored in the host computer, the modem transmitting to the host computer a request for selected textual information and receiving the selected textual information transmitted by the host computer over a transmission medium.

3. The portable electronic book of claim 2, wherein the icons displayed on the display page includes an icon representing the retrieval of the selected textual information through the modem.

4. The portable electronic book of claim 1, wherein the retrieved textual information is encrypted with a key code, the key code being related to the unique code number of the portable electronic book.

5. The portable electronic book of claim 1, wherein the icons displayed on the display page include a first icon representing the display of a subsequent display page and a second icon representing the display of a previous display page.

6. The portable electronic book of claim 1, wherein the icons displayed on the display page include a first icon representing the marking of the display page, a second icon representing the changing of fonts of text displayed on the display page, a third icon representing the underlining of text displayed on the display page and a fourth icon representing the deletion of selected textual information.

7. The portable electronic book of claim 1, wherein a set of the function keys is located on the display screen, the display screen being touch-sensitive, each function key of said set of the function keys being selected by touching the respective screen location.

8. The portable electronic book of claim 7 further comprises a touch-sensitive pen for selecting a function key or icon displayed on the touch-sensitive display screen.

9. A system for distributing textual information, comprising:

a host computer having a host memory for storing a plurality of textual information units and a list of code numbers, the host computer receiving a request for a selected textual information unit;

a first modem coupled to the host computer for transmitting a copy of the selected textual information unit over a transmission medium;

a second modem for transmitting the request and for receiving the transmitted copy of the selected textual information unit over the transmission medium; and a portable electronic book coupled to the second modem for generating the request and displaying the received copy of the selected textual information unit, the portable electronic book being remotely located from the host computer, the portable electronic book comprising:

a housing including a display screen for displaying textual information on display pages, the housing having a plurality of function keys corresponding to functions provided by the electronic book in generating the request and displaying the received copy of the selected textual information unit, some of the functions being represented by icons displayed on a display page of the display screen, the icons displayed on the display page varying in accordance to a selected function;

memory for storing the received copy of the selected textual information unit and information related to the icons for display on a display page, the memory including a unique code number related to a key code, the key code being transmitted along with the request for the selected textual information unit; and a processor coupled to the memory and the display screen for controlling the retrieval and display of the received copy of the selected textual information unit, the processor receiving input from the function keys and for controlling the display of the icons on the display screen;

wherein the host computer transmits a copy of the selected textual information unit to the portable electronic book after validating the identity of the portable electronic book by matching the key code with one code number in the list of code numbers, the transmitted copy of the selected textual information unit being readable only by the portable electronic book.

10. The system of claim 9, wherein the icons displayed on the display page of the portable electronic book includes an icon representing the retrieval of the copy of the selected textual information unit through the modem.

11. The system of claim 9, wherein the icons displayed on the display page of the portable electronic book include a first icon representing the display of a subsequent display page and a second icon representing the display of a previous display page.

12. The system of claim 9, wherein the icons displayed on the display page of the portable electronic book include a first icon representing the marking of the display page, a second icon representing the changing of fonts of text displayed on the display page, a third icon representing the underlining of text displayed on the display page and a fourth icon representing the deletion of selected textual information.

13. The system of claim 9, wherein a set of the function keys is located on the display screen, the display screen being touch-sensitive, each function key of said set of the function keys being selected by touching the respective screen location.

14. The system of claim 9, wherein the portable electronic book further comprises a touch-sensitive pen for selecting a function key or icon displayed on the touch-sensitive display screen.

15. The system of claim 9, wherein the host computer is a world wide website.

16. The system of claim 9, wherein the transmitted copy of the selected textual information unit is encrypted and compressed prior to transmission.

17. The system of claim 16, wherein the transmitted copy of the selected textual information is decrypted and decompressed by the portable electronic book.

18. The system of claim 9, wherein the display screen is selected from a group consisting of: a liquid crystal display, a cathode ray tube and an electro-luminescent display.

19. The system of claim 9, wherein the second modem is an integral part of the portable electronic book.

20. The system of claim 9, wherein the plurality of textual information units contains copyrighted material.

21. The system of claim 9, wherein the processor is configured to selectively purge a portion of the received copy of the selected textual information unit from the memory.

22. The system of claim 9, wherein the host computer maintains a record of each copy of the textual information unit, said copy being transmitted from the host memory.

23. The system of claim 22, wherein said record includes an identification of a recipient of said transmitted copy of the textual information unit.

24. A method for retrieving textual information stored in a remotely located host computer and for displaying the retrieved textual information on a display screen of a portable electronic book, the method comprising the steps of:
  transmitting, over a transmission medium, from a first modem coupled to the portable electronic book, a request for the textual information along with a key code indicating the identity of the portable electronic book, the key code being related to a unique code number associated with the portable electronic book;
  receiving the request over the transmission medium using a second modem coupled to the host computer;
  validating the identity of the portable electronic book by verifying the key code;
  transmitting from the second modem, an encrypted copy of the textual information;
  receiving the encrypted copy of the textual information using the first modem;
  decrypting the received encrypted copy of the textual information using the unique code number, the received encrypted copy of the textual information being readable only by the portable electronic book;
  storing in a memory of the portable electronic book the decrypted textual information and information related to icons for display on a display page, the icons being representative of functions provided by the portable electronic book;
  providing a plurality of function keys corresponding to functions provided by the electronic book in retrieving textual information and in displaying the stored textual information;
  displaying a portion of the stored textual information and icons on a first display page, the icons displayed on the first and each subsequent display page varying in accordance to the function selected;
  selecting a function key corresponding to the icons displayed on the first display page; and
  displaying a portion of the stored textual information in response to the selected function key.

25. The method of claim 24, further comprising the step of displaying an icon representing the retrieval of the encrypted copy of the textual information through the first modem.

26. The method of claim 24, wherein the step of displaying the icons on the display page includes displaying a first icon representing the display of a subsequent display page and a second icon representing the display of a previous display page.

27. The method of claim 24, wherein the step of displaying the icons displayed on the display page includes displaying a first icon representing the marking of the display page, a second icon representing the changing of fonts of text displayed on the display page, a third icon representing the underlining of text displayed on the display page and a fourth icon representing the deletion of a selected portion of the stored textual information.

28. The method of claim 24, wherein the step of selecting a function key includes selecting the function key by touching a corresponding icon.

29. The method of claim 24, wherein the step of selecting a function key includes selecting the function key by using a touch-sensitive pen.

30. A portable electronic book for retrieving textual information stored in a remotely located host computer and for displaying the retrieved textual information, the portable electronic book comprising:
  a housing including a touch-sensitive display screen for displaying the retrieved textual information in a readable form on display pages, the housing having a plurality of function keys corresponding to functions provided by the electronic book in retrieving textual information stored in the host computer and in displaying the retrieved textual information, a set of the function keys being located on the display screen, each function key of said set of the function keys being selected by touching the respective screen location, some of the functions being represented by icons displayed on a display page of the display screen, the icons displayed on the display page varying in accordance to a selected function;
  memory for storing the retrieved textual information, the memory including a unique code number associated with the portable electronic book;
  a processor coupled to the memory and display screen for controlling the retrieval of textual information stored in the host computer and the display of the retrieved textual information, the processor receiving input from the function keys; and
  a modulator and demodulator circuit for transmitting to the host computer a request for the textual information and for receiving the requested textual information transmitted over a transmission medium, the transmitted textual information being encrypted with a key code, the key code being related to the unique code number associated with the portable electronic book.

31. The portable electronic book of claim 30, wherein the display screen is selected from a group consisting of: a liquid crystal display, a cathode ray tube and an electro-luminescent display.

32. The portable electronic book of claim 30, wherein the housing further comprises a pen and a digitizer screen that is overlaid on the display screen.

33. The portable electronic book of claim 30, wherein the display screen further displays graphics, and wherein the processor further controls the retrieval and display of graphics.

34. The portable electronic book of claim 30, wherein the retrieved textual information contains copyrighted material.

35. The portable electronic book of claim 30, wherein said processor is further configured to selectively purge textual information from said memory.

36. A method for distributing textual information, comprising the steps of:

storing a plurality of textual information units in a host memory residing in a host computer;

transmitting, over a transmission medium, from a first modem coupled to a portable electronic book, a request for a selected textual information unit along with a key code indicating the identity of the portable electronic book, the key code being related to a unique code number associated with the portable electronic book;

receiving the request over the transmission medium using a second modem coupled to the host computer;

validating the identity of the portable electronic book by verifying the key code;

transmitting from the second modem, an encrypted copy of the selected textual information unit;

receiving the encrypted copy of the selected textual information unit using the first modem;

storing the received textual information unit in the portable electronic book, the portable electronic book comprising:

a housing including a touch-sensitive display screen to display the stored textual information unit on display pages, the housing including a plurality of function keys corresponding to functions provided by the portable electronic book in retrieving the selected textual information unit from the host computer and in displaying the stored textual information unit, a set of the function keys being located on the display screen, each function key of said set of the function keys being selected by touching the respective screen location, some of the functions being represented by icons displayed on a display page of the display screen, the icons displayed on the display page varying in accordance to a selected function;

memory for storing the received textual information unit and the unique code number; and a processor coupled to the memory and display screen for controlling the retrieval of the selected textual information unit from the host computer and the display of the stored textual information unit, the processor receiving input from the function keys; and decrypting for display the received encrypted copy of the selected textual information unit using the unique code number, the received encrypted copy of the textual information being readable only by the portable electronic book.

37. The method of claim 36, further comprising the step of compressing a copy of the selected textual information unit prior to encryption and transmission.

38. The method of claim 37, further comprising the step of decompressing the decrypted textual information unit for display by the portable electronic book.

39. The method of claim 36, wherein the portable electronic book housing further comprises a pen and a digitizer screen, the digitizer screen being overlaid on the display screen.

40. The method of claim 36, wherein the plurality of textual information units stored in the host memory includes copyrighted material.

41. The method of claim 36, further comprising the step of selectively purging a portion of the stored textual information unit from said memory.

42. The method of claim 36, further comprising the step of maintaining a record of each copy of each textual information unit, said copy being transmitted from said host memory.

43. The method of claim 42, wherein said record of each transmitted copy of each textual information unit includes an identification of a recipient of said transmitted copy.

* * * * *